US010473922B2

(12) United States Patent
Aruga et al.

(10) Patent No.: US 10,473,922 B2
(45) Date of Patent: Nov. 12, 2019

(54) CASING OF OPTICAL SCANNING APPARATUS AND OPTICAL SCANNING APPARATUS

(71) Applicant: CANON KABUSHIKI KAISHA, Tokyo (JP)

(72) Inventors: Daisuke Aruga, Abiko (JP); Hiroshi Nakahata, Abiko (JP); Yasuaki Otoguro, Abiko (JP); Takehiro Ishidate, Tokyo (JP); Yuta Okada, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 15/891,080

(22) Filed: Feb. 7, 2018

(65) Prior Publication Data

US 2018/0231769 A1    Aug. 16, 2018

(30) Foreign Application Priority Data

Feb. 15, 2017    (JP) .................................. 2017-025995

(51) Int. Cl.
*G02B 26/12*    (2006.01)
*B41J 2/44*    (2006.01)
(Continued)

(52) U.S. Cl.
CPC ......... *G02B 26/124* (2013.01); *G02B 26/121* (2013.01); *G02B 26/123* (2013.01);
(Continued)

(58) Field of Classification Search
CPC .. G02B 26/121; G02B 26/124; G02B 26/125; G02B 7/1821; H04N 1/036; H04N 1/113; B41J 2/442
(Continued)

(56) References Cited

U.S. PATENT DOCUMENTS 7,072,087 B2    7/2006    Nakahata .................... 359/204.1
7,298,390 B2    11/2007    Nakahata ....................... 347/231
(Continued)

FOREIGN PATENT DOCUMENTS

JP    2001-249295    9/2001

OTHER PUBLICATIONS

U.S. Appl. No. 15/702,219, filed Sep. 12, 2017.
(Continued)

*Primary Examiner* — Frank G Font
(74) *Attorney, Agent, or Firm* — Venable LLP

(57) ABSTRACT

A casing of an optical scanning apparatus housing a rotary polygon mirror and an optical member: a mounting portion on which a sound insulation member separating the optical member from the rotary polygon mirror is mountable; a first support portion supporting a transparent member which covers an opening of the casing on which the sound insulation member is mounted; a second support portion supporting a transparent member which covers the opening of the casing on which the sound insulation member is not mounted and is thicker than the transparent member to be supported by the first support portion; and a bearing surface of the second support portion located on an inner side of the casing than a bearing surface of the first support portion so that light beam emission surfaces of the transparent members to be supported by the first and second support portions are on a substantially same plane.

16 Claims, 12 Drawing Sheets

(51) Int. Cl.
*H04N 1/036* (2006.01)
*H04N 1/113* (2006.01)
*G02B 7/182* (2006.01)

(52) U.S. Cl.
CPC .......... *G02B 26/125* (2013.01); *H04N 1/036* (2013.01); *H04N 1/113* (2013.01); *B41J 2/442* (2013.01); *G02B 7/1821* (2013.01)

(58) Field of Classification Search
USPC ..... 359/216.1, 808, 871; 347/138, 152, 170, 347/263
See application file for complete search history.

(56) References Cited

U.S. PATENT DOCUMENTS

| | | | |
|---|---|---|---|
| 7,522,326 B1 | 4/2009 | Otoguro | 347/256 |
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,780,159 B2 * | 7/2014 | Serizawa | G02B 26/10 347/245 |
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2005/0270612 A1 * | 12/2005 | Akiyama | G02B 7/1821 359/206.1 |
| 2006/0187513 A1 * | 8/2006 | Ohsugi | G02B 26/12 359/212.1 |
| 2007/0058235 A1 * | 3/2007 | Nagase | G02B 26/121 359/216.1 |
| 2008/0259430 A1 * | 10/2008 | Fukushima | G02B 27/0006 359/216.1 |
| 2009/0231658 A1 * | 9/2009 | Hisa | G02B 26/121 359/216.1 |
| 2009/0244670 A1 | 10/2009 | Sato et al. | 359/205.1 |
| 2009/0296179 A1 * | 12/2009 | Murakami | G02B 26/121 359/198.1 |
| 2012/0081770 A1 | 4/2012 | Sato et al. | 359/204.1 |
| 2012/0182367 A1 * | 7/2012 | Masuda | B41J 2/473 347/118 |
| 2013/0147895 A1 * | 6/2013 | Miyatake | G03G 15/04036 347/224 |
| 2015/0331350 A1 * | 11/2015 | Johno | H04N 1/113 347/118 |
| 2016/0152041 A1 * | 6/2016 | Ishida | B41J 2/471 347/260 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/908,482, filed Feb. 28, 2018.
U.S. Appl. No. 15/718,510, filed Sep. 28, 2017.

* cited by examiner

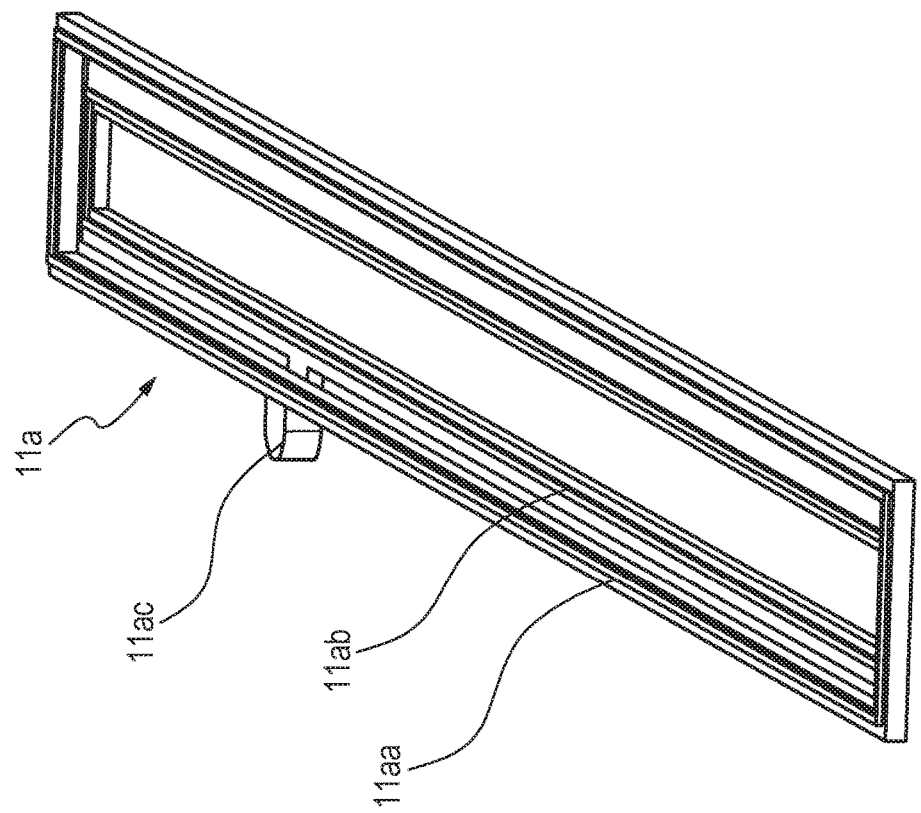
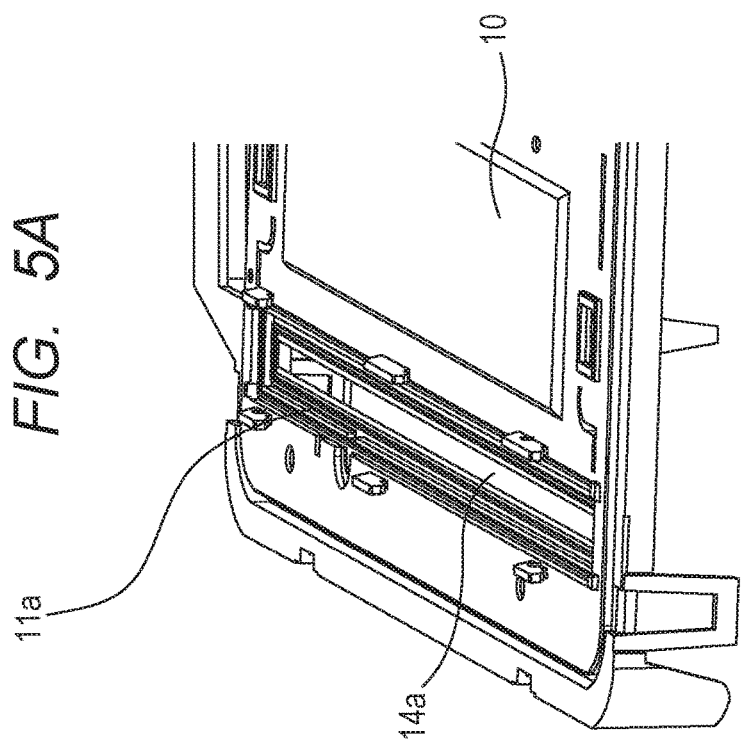

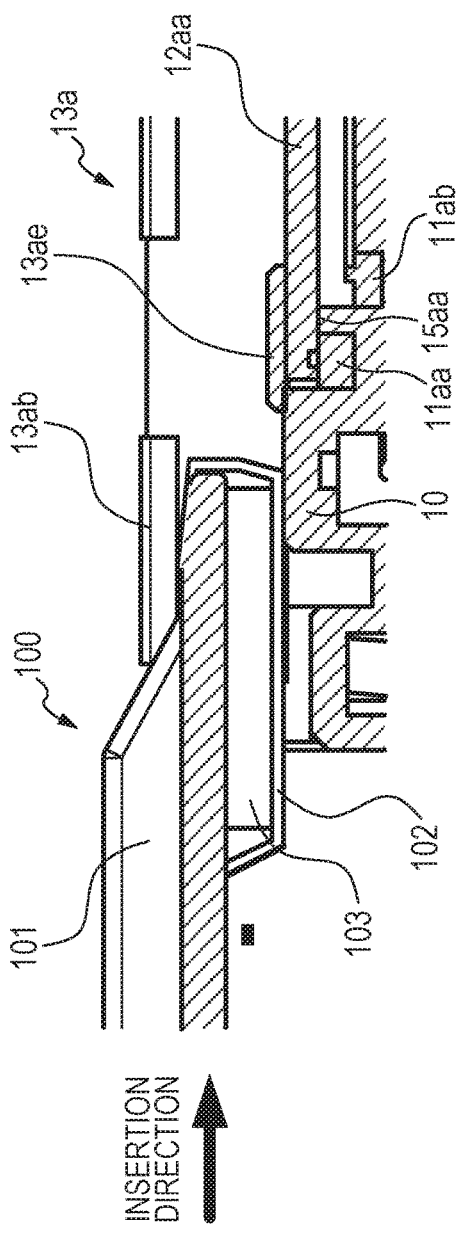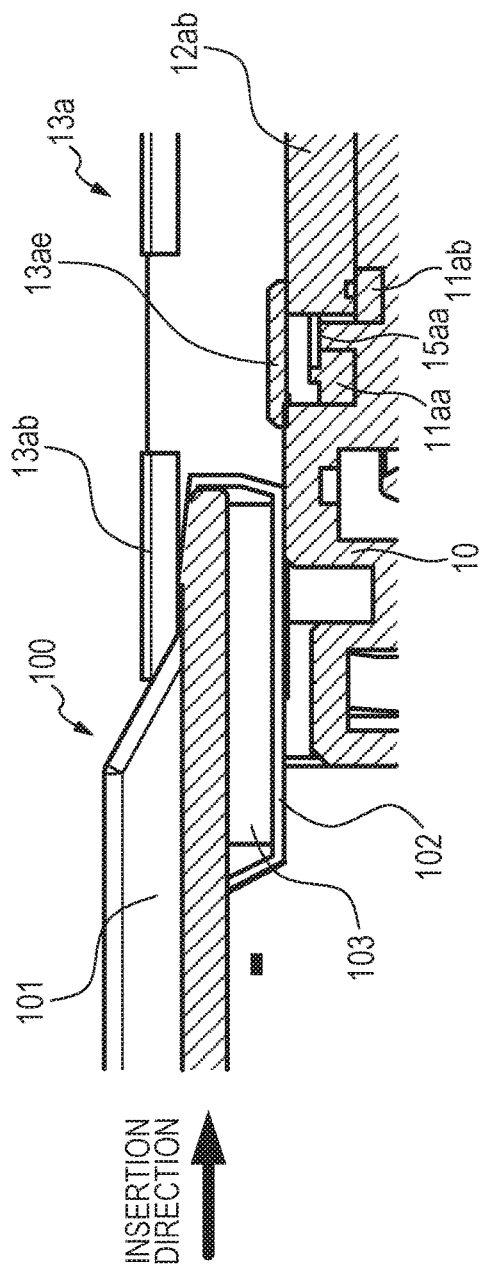

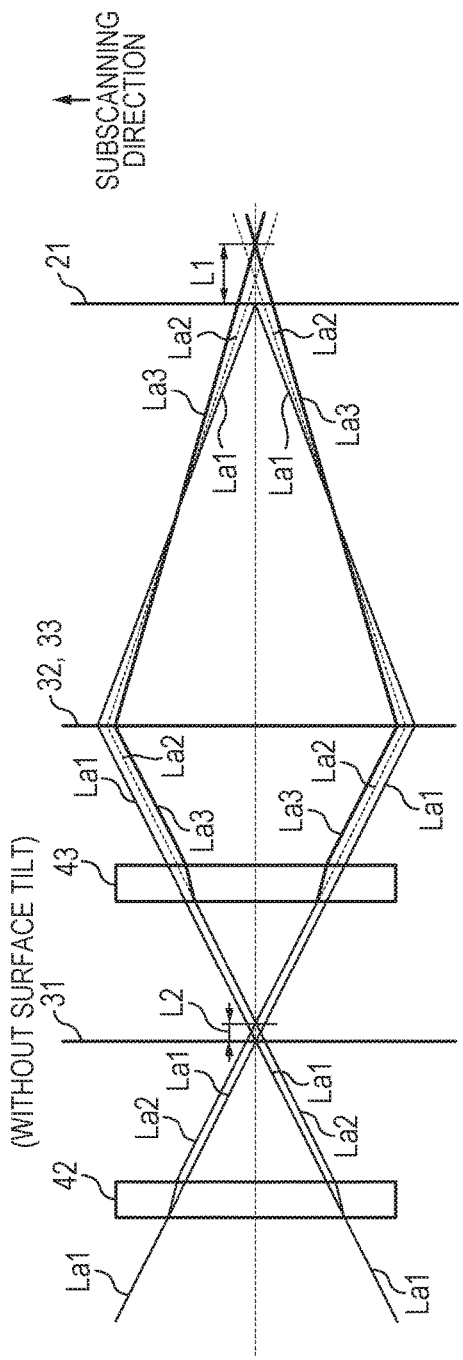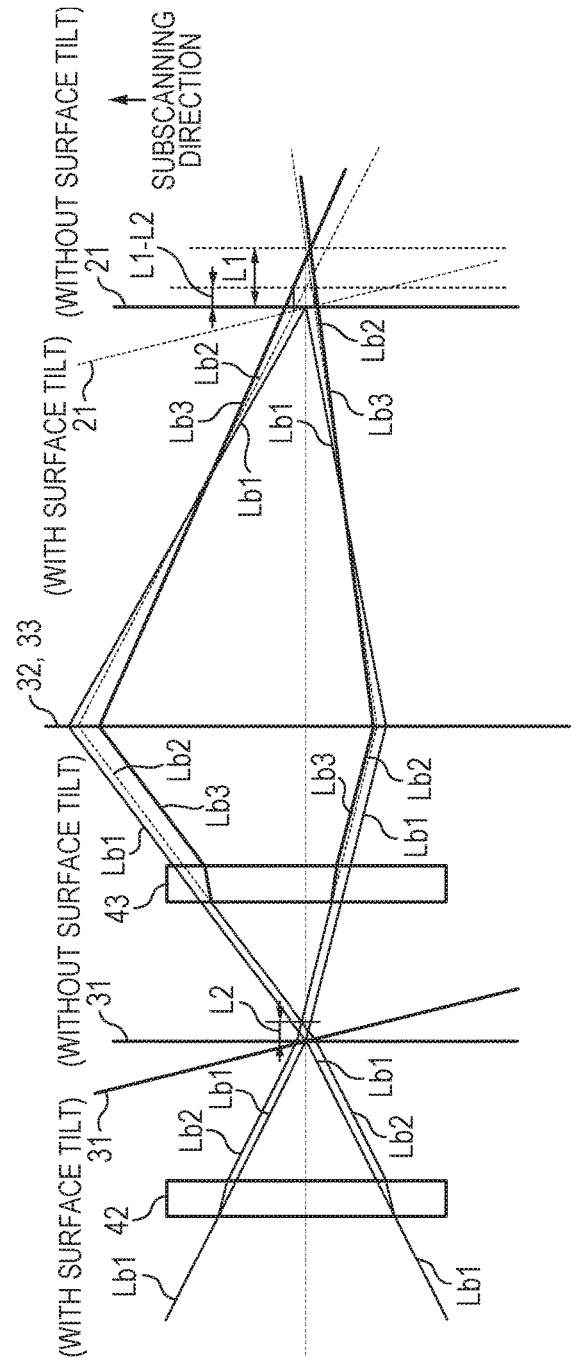
FIG. 12A
FIG. 12B

CASING OF OPTICAL SCANNING APPARATUS AND OPTICAL SCANNING APPARATUS

BACKGROUND OF THE INVENTION

Field of the Invention

The present invention relates to an optical box of an optical scanning apparatus mounted on an image forming apparatus using an electrophotographic process and an optical scanning apparatus including the optical box.

Description of the Related Art

There are image forming apparatuses that form images using an electrophotographic process and are provided with an optical scanning apparatus. FIG. 9 is a cross-sectional view illustrating a configuration of an image forming apparatus 50 that includes a plurality of image forming portions and prints a color image on a sheet (also referred to as a "recording material") using a known electrophotographic process. The image forming apparatus 50 shown in FIG. 9 includes four image forming portions containing yellow (Y), magenta (M), cyan (C) and black (K) toners respectively. An optical scanning apparatus 20 irradiates photosensitive drums 21Y, 21M, 21C and 21K with a laser beam based on image information transmitted from an image reading apparatus (not shown) or a personal computer (not shown). FIG. 10 is a perspective view illustrating a configuration of the optical scanning apparatus 20 mounted on the image forming apparatus 50. The optical scanning apparatus 20 includes one rotary polygon mirror 31 provided at a center of a casing 35. To achieve a size reduction of the image forming apparatus 50, a scheme is used in which the photosensitive drums 21 of the plurality of image forming portions are exposed using one rotary polygon mirror 31. Laser beams emitted from light source units 31a and 31b are deflected by the rotary polygon mirror 31. After that, the corresponding photosensitive drum 21 is exposed by each laser beam via a scanning optical system and a reflection mirror provided for each light source.

A rotation speed of the rotary polygon mirror 31 is set based on resolution, sheet conveying speed, rotation speed of the photosensitive member and the number of light emitting points from which light beams for exposing the photosensitive member is emitted. That is, the rotation speed of the rotary polygon mirror 31 differs depending on each product specification. When an optical scanning apparatus having the same structure is mounted on a plurality of image forming apparatuses with different levels of productivity, the rotation speed of the rotary polygon mirror needs to be set appropriately in accordance with the specification of each image forming apparatus. For example, for an image forming apparatus A having an output sheet count per minute (productivity) of 70 and an image forming apparatus B having an output sheet count per minute of 50, it is assumed that sheets are conveyed at the same sheet interval. In this case, the image forming apparatus A needs to be set to a greater sheet conveying speed and a greater rotation speed of the photosensitive member than those of the image forming apparatus B. At this time, if an optical scanning apparatus of the same structure is mounted on the image forming apparatus A and the image forming apparatus B, the rotation speed of the rotary polygon mirror needs to be set as follows so that the interval of scan lines formed in respective scanning cycles of respective light beams is set to be equivalent to the resolution. That is, the rotation speed of the rotary polygon mirror of the image forming apparatus A needs to be set to be greater than the rotation speed of the rotary polygon mirror of the image forming apparatus B.

In general, as the rotation speed of the rotary polygon mirror increases, a noise level (wind noise) caused by rotation of the rotary polygon mirror also increases. Examples of a technique for reducing the noise level include a method of providing a sound insulation wall inside a casing (optical box) of the optical scanning apparatus. For example, as shown in FIGS. 11A and 11B, the periphery of the rotary polygon mirror 31 of the image forming apparatus A is covered with sound insulation members 40 and 41. The technique thereby prevents noise from leaking to outside the casing of the optical scanning apparatus. The sound insulation members 40 and 41 are provided with a transparent window 43a and a transparent window 43b (transparent window 43b is positioned at the opposite side of transparent window 43a as similarly shown in the depiction of an embodiment at FIG. 1) to allow laser beams deflected by the rotary polygon mirror 31 to transmit therethrough. The sound insulation members 40 and 41 may also be provided with transparent windows 42a and 42b to allow laser beams emitted from the light source units 31a and 31b and directed toward the rotary polygon mirror 31 to transmit therethrough. No sound insulation member 40 is set up in the image forming apparatus B. Therefore, neither transparent window 43a nor 43b exists in the image forming apparatus B.

Adopting an optical scanning apparatus having the same structure other than the presence or absence of the sound insulation members 40 and 41 for the image forming apparatuses A and B results in the following problem. That is, under an influence of the transparent window 43 of the sound insulation member 40, optical misalignment (defocusing and conjugate point misalignment) as shown in FIGS. 12A and 12B occurs. Details of FIG. 9 to FIGS. 12A and 12B will be described later. To cope with such defocusing and conjugate point misalignment, for example, Japanese Patent Application Laid-Open No. 2001-249295 proposes a casing of an optical scanning apparatus capable of adjusting a mounting position of a rotary polygon mirror to enable adjustment of a light path length.

According to this prior art, since the position of the rotary polygon mirror differs depending on the presence or absence of the sound insulation member, a configuration is proposed in which a positioning hole for mounting the rotary polygon mirror in the casing of the optical scanning apparatus is replaceable. In this configuration, molding is performed by replacing pieces at positions for positioning the rotary polygon mirror depending on the presence or absence of the sound insulation member. This changes a relative positional relationship between the rotary polygon mirror and respective optical parts of a scanning optical system that guides the light beam deflected by the rotary polygon mirror to a photosensitive member. As a result, optical performance of the parts attached to the image forming apparatus of at least one specification deteriorates. Mounting an electrical correction processing unit on the image forming apparatus to compensate for deterioration of the optical performance may reduce the cost merit that the optical scanning apparatus is shared among image forming apparatuses of different specifications.

The present invention has been implemented in such circumstances, and it is an object of the present invention to secure stable optical performance irrespective of the presence or absence of a sound insulation member that covers the rotary polygon mirror.

SUMMARY OF THE INVENTION

In order to solve the aforementioned problem, the present invention is provided with the following component.

A casing of an optical scanning apparatus housing a rotary polygon mirror having a plurality of reflecting surfaces and deflecting a light beam emitted from a light source, and an optical member including at least one of an imaging lens that causes the light beam deflected by the rotary polygon mirror to be imaged on a photosensitive member and a reflection mirror that guides the light beam deflected by the rotary polygon mirror to the photosensitive member, the casing in which an opening is formed that allows to pass the light beam for scanning the photosensitive member, the casing includes: a mounting portion on which a sound insulation member is mountable, wherein the sound insulation member separates an arrangement space of the optical member from an arrangement space of the rotary polygon mirror, reduces propagation of sound generated by rotation of the rotary polygon mirror from the arrangement space of the rotary polygon mirror to the arrangement space of the optical member, and has a transparent window through which the light beam deflected by the rotary polygon mirror is emitted; a first support portion configured to support a transparent member which covers the opening of the casing which is used as an optical scanning apparatus on which the sound insulation member is mounted and allows the light beam to pass from inside to outside the casing; a second support portion configured to support a transparent member which covers the opening of the casing which is used as an optical scanning apparatus on which the sound insulation member is not mounted, allows the light beam to pass from inside to outside the casing, and is thicker than the transparent member to be supported by the first support portion for covering the opening of the casing which is used as the optical scanning apparatus on which the sound insulation member is mounted; and a bearing surface of the second support portion that is to be brought into contact with the transparent member to be supported by the second support portion and that is located on an inner side of the casing, in which the optical member is arranged, than a bearing surface of the first support portion to be brought into contact with the transparent member to be supported by the first support portion, so that a light beam emission surface of the transparent member to be supported by the first support portion and a light beam emission surface of the transparent member to be supported by the second support portion are on a substantially same plane.

According to the present invention, it is possible to secure stable optical performance irrespective of the presence or absence of a sound insulation member that covers the rotary polygon mirror.

Further features of the present invention will become apparent from the following description of exemplary embodiments with reference to the attached drawings.

BRIEF DESCRIPTION OF THE DRAWINGS

FIG. 5A illustrates a configuration of an elastic member according to the embodiment.

FIG. 5B illustrates a configuration of the elastic member according to the embodiment.

FIG. 8A illustrates the cleaning rod inserted into the cleaning rod guide according to the embodiment.

FIG. 8B illustrates the cleaning rod inserted into the cleaning rod guide according to the embodiment.

FIG. 12A illustrates a change in a focus and conjugate points depending on the presence or absence of the sound insulation member according to the comparative example.

FIG. 12B illustrates a change in a focus and conjugate points depending on the presence or absence of the sound insulation member according to the comparative example.

DESCRIPTION OF THE EMBODIMENTS

Embodiments of the present invention will now be described in detail in accordance with the accompanying drawings.

[Configuration of Image Forming Apparatus]

Figure 9:
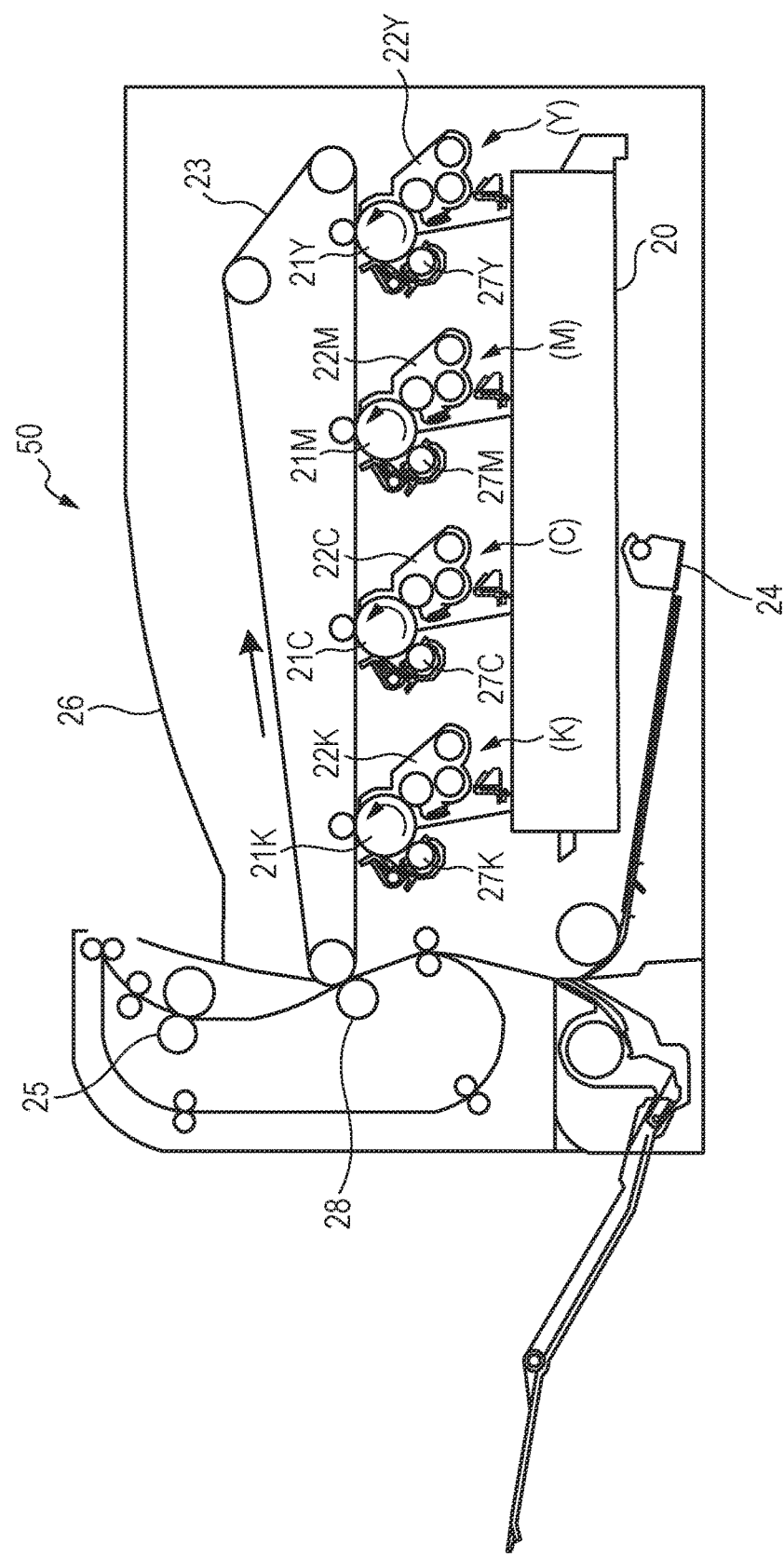
FIG. 9 is a cross-sectional view illustrating a configuration of an image forming apparatus according to a comparative example.

For a comparison with an embodiment, an image forming apparatus and an optical scanning apparatus according to a comparative example will be described using FIG. 9 to FIGS. 12A and 12B first. FIG. 9 is a cross-sectional view illustrating a configuration of an image forming apparatus 50 which is provided with a plurality of image forming portions and prints a color image on a sheet (also referred to as "recording material") using a known electrophotographic process. The image forming apparatus 50 shown in FIG. 9 includes four image forming portions having yellow (Y) (denoted by (Y) in FIG. 9), magenta (M) (denoted by (M) in FIG. 9), cyan (C) (denoted by (C) in FIG. 9) and black (K) (denoted by (K) in FIG. 9) toners from the right side. Hereinafter, reference characters Y, M, C and K denoting the toner colors will be omitted except where necessary. One image forming portion includes a photosensitive drum 21 which is a photosensitive member, a developing device 22 and a charger 27, all the image forming portions having the same configuration. An optical scanning apparatus 20 exposes the photosensitive drum 21 with a laser beam based on image information transmitted from an image reading apparatus (not shown) or a personal computer (not shown). The optical scanning apparatus 20 is mounted with a light emitting source corresponding to the image forming portion to expose the photosensitive drum 21 of each image forming portion.

The photosensitive drum 21 formed by applying a photosensitive layer to a conductor is charged to a predetermined potential by the charger 27. An electrostatic latent image is formed on the surface of the photosensitive drum 21 by a laser beam emitted from the optical scanning apparatus 20. The developing device 22 causes the toner charged by friction to adhere to the latent image on the photosensitive drum 21, develops the image and forms a toner image. The toner image formed on each photosensitive drum 21 is transferred to an intermediate transfer belt 23. A paper feeding cassette 24 stores sheets to which the toner image on the intermediate transfer belt 23 is transferred. The sheets fed from the paper feeding cassette 24 are carried to a transfer roller 28. The toner image formed on the intermediate transfer belt 23 is transferred to the sheets by the transfer roller 28. A fixing device 25 heats and presses the toner image transferred to the sheets and fixes the toner image to the sheets. The sheets to which the toner image is fixed by the fixing device 25 are ejected onto an ejection tray 26. The embodiment is not limited to a color image forming apparatus, but may be a monochrome image forming apparatus.

[Configuration of Optical Scanning Apparatus]

Figure 10:
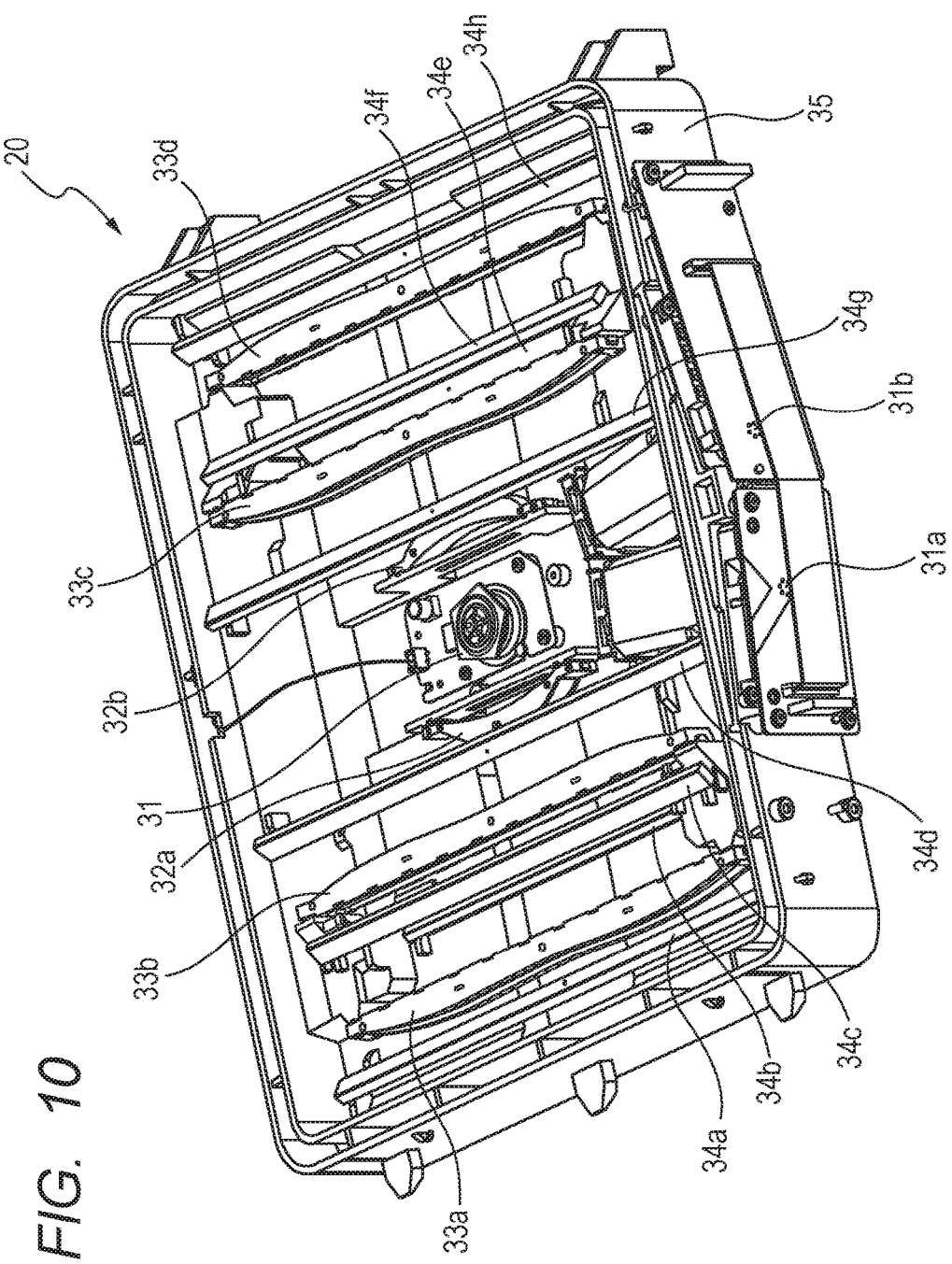
FIG. 10 is a perspective view illustrating a configuration of an optical scanning apparatus according to the comparative example.

FIG. 10 is a perspective view illustrating a configuration of the optical scanning apparatus 20 mounted on the image forming apparatus 50. The optical scanning apparatus 20 shown in FIG. 10 uses a scheme in which one rotary polygon mirror 31 exposes the photosensitive drums 21 of a plurality of image forming portions to achieve miniaturization of the image forming apparatus 50. In FIG. 10, the rotary polygon mirror 31 which is commonly used for the plurality of image forming portions is provided at the center of the optical scanning apparatus 20. Laser beams emitted from the light source units 31a and 31b are deflected by the rotary polygon mirror 31. After that, the surface of the corresponding photosensitive drum 21 is exposed by the laser beam passing through a scanning optical system and a reflection mirror provided for each light source. The optical scanning apparatus 20 is provided with optical systems arranged to the left and to the right of the rotary polygon mirror 31 respectively in FIG. 10. The light source units 31a and 31b are respectively provided with light-emitting sections corresponding to two toner colors. The photosensitive drums 21K and 21C of the image forming portions corresponding to black (K) and cyan (C) are exposed by the respective laser beams emitted from the light source unit 31a. The photosensitive drums 21M and 21Y of the image forming portions corresponding to magenta (M) and yellow (Y) are exposed by the respective laser beams emitted from the light source unit 31b.

The light source units 31a and 31b each include a semiconductor laser (not shown), a collimator lens (not shown) that converts a laser beam emitted from the semiconductor laser to a parallel beam and a cylinder lens (not shown) for linearly imaging the laser beam on the rotary polygon mirror 31. Each laser beam passes through first imaging lenses 32a and 32b, and second imaging lenses 33a, 33b, 33c and 33d for scanning the laser beam on the photosensitive drum 21 at an equal speed to image the laser beam. Each laser beam passes through the first and second imaging lenses of the scanning optical system, then passes through respective reflection mirrors 34a, 34b, 34c, 34d, 34e, 34f, 34g and 34h and forms an electrostatic latent image on the photosensitive drum 21. Each reflection mirror 34a to 34h reflects (folds) the laser beam toward a predetermined direction to guide the laser beam to the corresponding photosensitive drum 21 of the image forming portion. The components of the optical scanning apparatus 20 in FIG. 10 are housed in the casing 35 (also referred to as an "optical box 35"). An opening surface at the top is hermetically sealed with a top cover (not shown) which is a cover member.

[Noise Countermeasure of Rotary Polygon Mirror]

The rotation speed of the rotary polygon mirror 31 is set based on the resolution, sheet conveying speed, rotation speed of the photosensitive drum 21 and the number of light emitting points from which a laser beam for exposing the photosensitive drum 21 is emitted. That is, the rotation speed of the rotary polygon mirror 31 varies depending on the specification of each product. The optical scanning apparatus 20 of the same structure is mounted on a plurality of image forming apparatuses with different productivity levels. In this case, the rotation speed of the rotary polygon mirror needs to be set appropriately depending on the specification of the image forming apparatus. For example, regarding an image forming apparatus A having an output sheet count per minute (productivity) of 70 and an image forming apparatus B having an output sheet count per minute of 50, their respective speeds need to be set as follows when sheets are assumed to be conveyed at the same sheet interval. That is, the image forming apparatus A needs to be set so as to have a greater sheet conveying speed and a greater rotation speed of the photosensitive drum 21 than those of the image forming apparatus B. At this time, if the optical scanning apparatus 20 of the same structure is mounted on the image forming apparatus A and the image forming apparatus B, the rotation speed of the rotary polygon mirror 31 needs to be set as follows so that the interval of scan lines formed in respective scanning cycles of respective laser beams is set to be equivalent to the resolution. That is, the rotation speed of the rotary polygon mirror 31 of the image forming apparatus A needs to be set to be greater than the rotation speed of the rotary polygon mirror 31 of the image forming apparatus B. In general, as the rotation speed of the rotary polygon mirror 31 increases, a noise level (wind noise) caused by rotation of the rotary polygon mirror 31 also increases.

As a technique for restraining an increase of the rotation speed of the rotary polygon mirror 31, increasing the number of beams of a semiconductor laser used for the light source units 31a and 31b is generally known. Using a semiconductor laser having a greater number of beams than that of a widely distributed semiconductor laser generally leads to a considerable cost increase. Furthermore, when both the resolution and productivity are improved simultaneously, a semiconductor laser adaptable to such an improvement may not be available and a simple increase in the number of beams of the semiconductor laser can no longer achieve the improvement. In such a case, the rotation speed of the rotary polygon mirror 31 needs to be increased, but the level of noise generated from the rotary polygon mirror 31 becomes a problem.

Figure 11A:
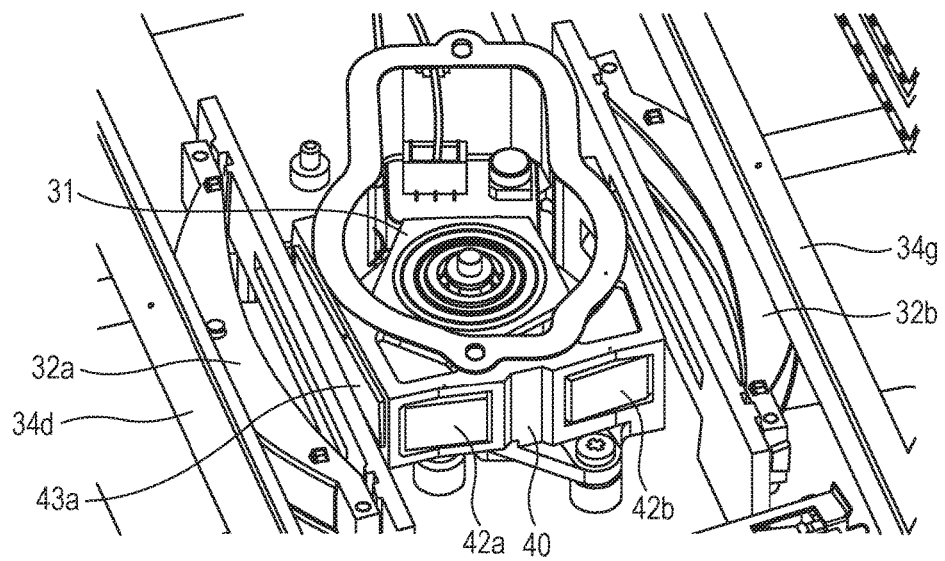
FIG. 11A illustrates a sound insulation member of a rotary polygon mirror according to the comparative example.
Figure 11B:
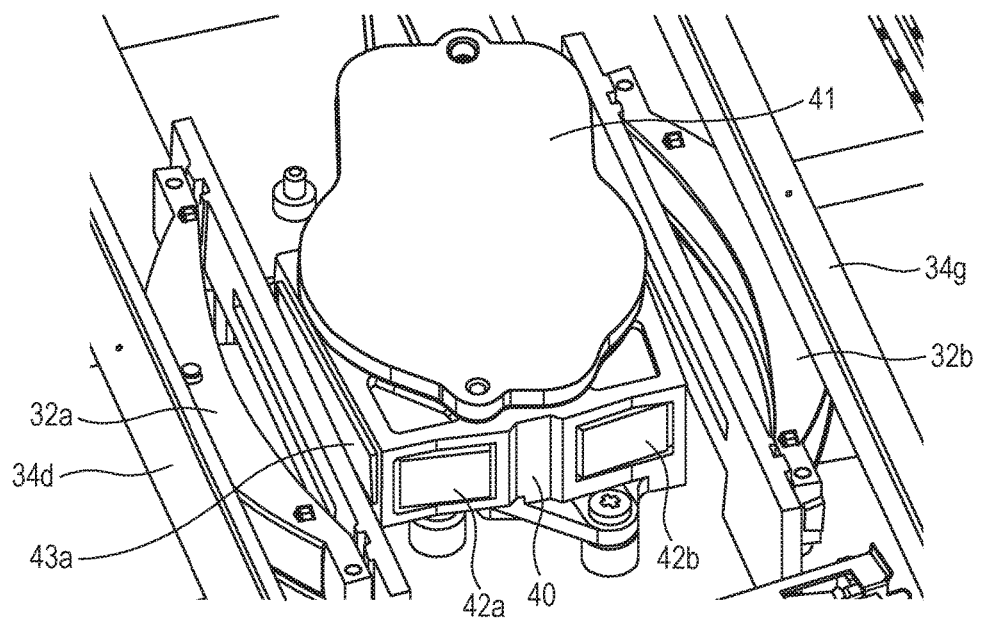
FIG. 11B illustrates the sound insulation member of the rotary polygon mirror according to the comparative example.

A one example of techniques for reducing the noise level is a technique whereby the periphery of the rotary polygon mirror 31 is covered with sound insulation members 40 and 41 as shown in FIGS. 11A and 11B to prevent noise from leaking to outside the casing. FIG. 11A is a perspective view in which the sound insulation member 41 which is a cover portion provided on the sound insulation member 40 is removed for convenience of explanation. FIG. 11B is a perspective view illustrating a situation in which the sound insulation member 41 is assembled with the sound insulation member 40 and the periphery of the rotary polygon mirror 31 is hermetically sealed. The sound insulation member 40 is fixed to a mounting bearing surface which is a mounting portion of the sound insulation member 40 provided in the casing 35 using a fastening member such as a screw. The sound insulation member 40 is provided with transparent windows 42a and 42b which are first transparent windows (as light transmission members for transmitting the laser beams) at parts through which laser beams emitted from the light source units 31a and 31b pass when traveling toward the rotary polygon mirror 31. Furthermore, transparent windows 43a and 43b (opposite side of the transparent window 43a) which are second transparent windows (as light transmission members for transmitting the laser beams) are provided at parts through which laser beams deflected by the rotary polygon mirror 31 pass when traveling. The sound insulation members 40 and 41 are provided as one unit (one pair of sound insulation members). Therefore, except when the sound insulation members 40 and 41 are discriminately described in particular, they will be hereinafter referred to as a "sound insulation member 40" including the sound insulation member 41. In the present embodiment, the transparent windows 42a and 43a are described as different members, but the transparent windows 42a and 43a may be considered as an integrated transparent window. Similarly, the transparent windows 42b and 43b are described as different members in the present embodiment, but the transparent windows 42b and 43b may be considered as an integrated transparent window. Moreover, the transparent windows 42a, 43a, 42b and 43b may be considered as an integrated transparent window.

The periphery of the rotary polygon mirror 31 is hermetically sealed using the sound insulation member 40 as shown in FIGS. 11A and 11B. It is thereby possible to separate an optical member arrangement space in which the imaging lens and the reflection mirror are arranged from an arrangement space for the rotary polygon mirror 31 in which the rotary polygon mirror 31 for deflecting a laser beam from the light source is arranged. As a result, it is possible to seal in large noise generated in the vicinity of the rotary polygon mirror 31 inside the sound insulation member 40, thereby prevent propagation of noise and reduce the level of noise emitted from the optical scanning apparatus 20. The addition of the sound insulation member results in a cost increase. Therefore, it is not preferable in respect of cost to assemble the same sound insulation member 40 even in a low-noise-level product with the rotary polygon mirror 31 driven to rotate at low speed. Therefore, even when the same casing 35 is used, a product in which the rotary polygon mirror 31 is driven to rotate at high speed is provided with the sound insulation member 40, whereas a product in which the rotary polygon mirror 31 is driven to rotate at low speed is not provided with the sound insulation member 40. A configuration example will be described in the present embodiment where all the optical members including the lenses and the reflection mirrors that guide light beams deflected by the rotary polygon mirror 31 to the photosensitive drum are arranged outside the sound insulation member 40. However, the embodiment is not limited to this. In the embodiment, some of the plurality of optical members that guide the light beam deflected by the rotary polygon mirror 31 to the photosensitive drum, that is, at least one of imaging lenses or reflection mirrors may be located outside the sound insulation member 40. In other words, some of the plurality of optical members that guide the light beam deflected by the rotary polygon mirror 31 to the photosensitive drum, that is, at least one of imaging lenses or reflection mirrors may be located inside the sound insulation member 40.

While the same casing 35 is used, the sound insulation member 40 is not used for a product in which the rotary polygon mirror 31 rotates at low speed and the sound insulation member 40 is used only for a product in which the rotary polygon mirror 31 rotates at high speed. In this case, optical misalignment may be generated due to influences of the transparent windows 42 and 43 provided in the parts of the sound insulation member 40 through which the laser beams pass. FIGS. 12A and 12B are schematic views describing an optical change generated depending on the presence or absence of the transparent windows 42 and 43 provided in the parts through which the laser beams toward the rotary polygon mirror 31 pass. FIGS. 12A and 12B show simplified views of the transparent windows 42 and 43 provided in the sound insulation member 40 that hermetically seals the vicinity of the rotary polygon mirror 31 and the scanning optical systems. Furthermore, FIGS. 12A and 12B show cross sections in the subscanning direction to describe an imaging relationship in the subscanning direction (direction orthogonal to the main-scanning direction in which the photosensitive drum 21 is scanned) of the laser beams.

FIG. 12A is a schematic view describing optical paths of laser beams emitted from the light source units 31a and 31b when there is no surface tilt of the rotary polygon mirror 31. Glass or plastic (polymer) is normally used as a light transmission member for the transparent windows 42 and 43. The scanning optical system forms an image of a laser beam on the photosensitive drum 21. The first imaging lenses 32a and 32b, the second imaging lenses 33a to 33d are shown as a single lens 32 and 33 to simplify the drawings. The imaging lens is optically designed so that the reflecting surface of the rotary polygon mirror 31 and the surface of the photosensitive drum 21 have a conjugate relationship. That is, the imaging lens is optically designed such that a spot having substantially the same diameter as that of the spot on the reflecting surface of the rotary polygon mirror is reproduced on the surface (surface of the photosensitive member) of the photosensitive drum 21. In FIG. 12A, an optical path La1 represents an optical path when no sound insulation member 40 is provided, an optical path La2 represents an optical path after the optical path La1 is refracted by the transparent window 42 and an optical path La3 represents an optical path after the optical path La2 is refracted by the transparent window 43. A dotted line at the center in FIG. 12A represents the optical axis of the laser beam.

As shown in FIG. 12A, when the rotary polygon mirror 31 is not provided with the sound insulation member 40, the laser beam emitted from the light source forms an image on the photosensitive drum 21 through the optical path La1. In the configuration using the sound insulation member 40, the laser beam is refracted by the transparent window 42 provided at a light incidence part of the sound insulation member 40. Therefore, the optical path of the laser beam is changed from the optical path La1 to the optical path La2 and defocusing with a misalignment amount L2 is generated on the rotary polygon mirror 31 in the traveling direction of the laser beam. The laser beam deflected by the rotary polygon mirror 31 passes through the transparent window 43 provided at a light emitting part of the sound insulation member 40 and the laser beam is thereby refracted. Therefore, the optical path of the laser beam is changed from the optical path La2 to the optical path La3. As a result, the amount of misalignment increases and defocusing of a misalignment amount L1 (L2<L1) is generated on the photosensitive drum 21 in the traveling direction of the laser beam.

FIG. 12B is a schematic view describing optical paths of laser beams emitted from the light source units 31a and 31b when there is a surface tilt of the rotary polygon mirror 31. The state of the surface tilt of the rotary polygon mirror 31 is shown as "31 (without surface tilt)" and "31 (with surface tilt)" in FIG. 12B. The surface of the photosensitive drum 21 without surface tilt is shown as "21 (without surface tilt)" in FIG. 12B. The surface of the photosensitive drum 21 with a surface tilt, that is, the conjugate position with respect to the reflecting surface position of the rotary polygon mirror 31 when there is a surface tilt is shown as "21 (with surface tilt)" in FIG. 12B. Furthermore, an optical path Lb1 in FIG. 12B represents an optical path when no sound insulation member 40 is provided, an optical path Lb2 represents an optical path after the optical path Lb1 is refracted by the transparent window 42 and an optical path Lb3 represents an optical path after the optical path Lb2 is refracted by the transparent window 43. Note that a dotted line at the center in FIG. 12B shows the optical axis of the laser beam. The rest of the configuration is similar to that in FIG. 12A.

As shown in FIG. 12B, when the rotary polygon mirror 31 is not provided with the sound insulation member 40, the optical path Lb1 is not symmetric with respect to the optical axis due to the surface tilt (it is symmetric in FIG. 12A). However, the laser beam emitted from the light source forms an image on the photosensitive drum 21 through the optical path Lb1. In the configuration using the sound insulation member 40, the laser beam is refracted by the transparent window 42 provided at the light incidence part of the sound insulation member 40. Therefore, the optical path of the laser beam is changed from the optical path Lb1 to the optical path Lb2, and defocusing of a misalignment amount L2 is generated on the rotary polygon mirror 31 in the traveling direction of the laser beam. The laser beam deflected by the rotary polygon mirror 31 passes through the transparent window 43 provided at the light emitting part of the sound insulation member 40 (provided at a position corresponding to the emission surface). In this way, since the laser beam is refracted, the optical path of the laser beam is changed from the optical path Lb2 to the optical path Lb3. As a result, the refraction by the transparent window 43 through which the laser beam passes after being deflected by the rotary polygon mirror 31 causes a conjugate point misalignment, and the amount of the conjugate point misalignment becomes (L1–L2).

EXAMPLE

[Configuration of Optical Scanning Apparatus]

Figure 1:
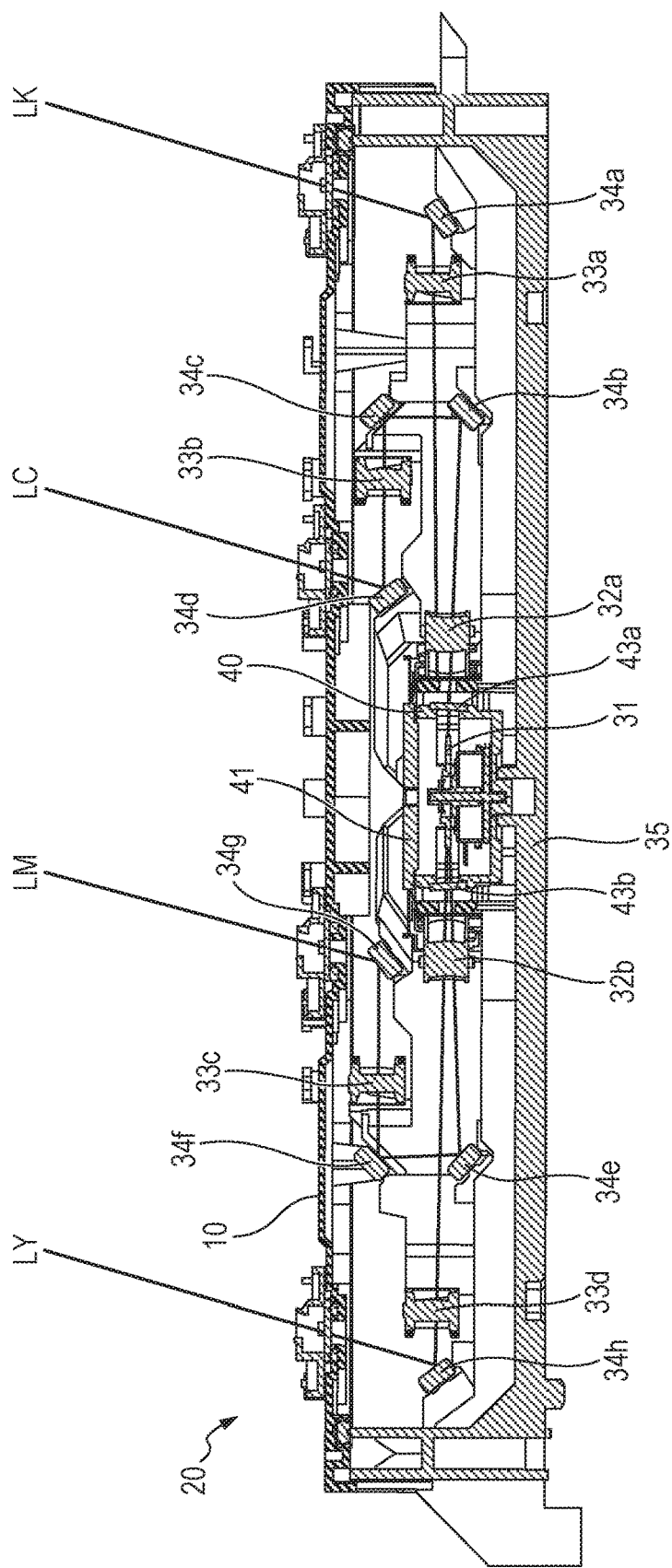
FIG. 1 is a cross-sectional view describing a configuration of an optical scanning apparatus according to an embodiment of the present invention.

FIG. 1 is a cross-sectional view illustrating a configuration of the optical scanning apparatus 20 described in FIG. 10. FIG. 1 shows a cross section of the optical scanning apparatus 20 shown in FIG. 10 when seen from the back side toward the front direction in FIG. 1. Since the light source units 31a and 31b from which the laser beams are emitted are provided on the back side in FIG. 1, they are not shown in FIG. 1. In FIG. 1, the same members as those in FIG. 10 are assigned the same reference numerals.

As shown in FIG. 1, the rotary polygon mirror 31 is provided at the center of the optical scanning apparatus 20. The laser beam emitted from the respective light source units 31a and 31b (not shown) are deflected by the rotary polygon mirror 31. The laser beams deflected by the rotary polygon mirror 31 pass through the transparent windows 43a and 43b of the sound insulation member 40 and the imaging lenses 32a, 32b, 33a to 33d and the reflection mirrors 34a to 34h of the scanning optical systems provided in the respective optical paths. The photosensitive drum 21 of each image forming portion is exposed by this light beam. The optical scanning apparatus 20 shown in FIG. 1 emits laser beams LY, LM, LC and LK for exposing the photosensitive drum 21 of each image forming portion of yellow (Y), magenta (M), cyan (C) and black (K) in order from optical paths on the left side shown by solid lines in FIG. 1 from a light emission port of the top cover 10. The light emission port is an opening provided in the top cover 10. The rotary polygon mirror 31 provided at the center of the casing 35 is covered with the sound insulation member 40 and the sound insulation member 41 corresponding to the cover portion of the sound insulation member 40 to reduce noise generated from the rotary polygon mirror 31.

[Configuration of Dust-Proof Glass Plate]

Figure 2A:
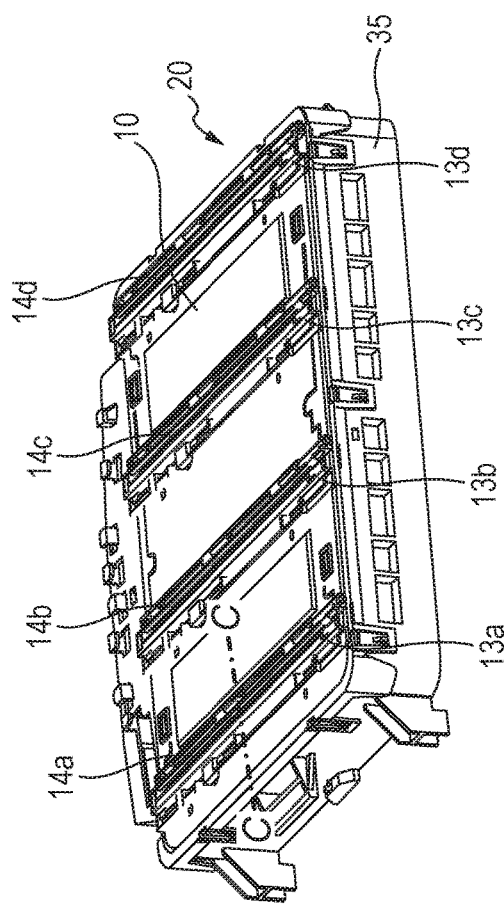
FIG. 2A illustrates a configuration of a dust-proof window according to the embodiment.
Figure 2B:
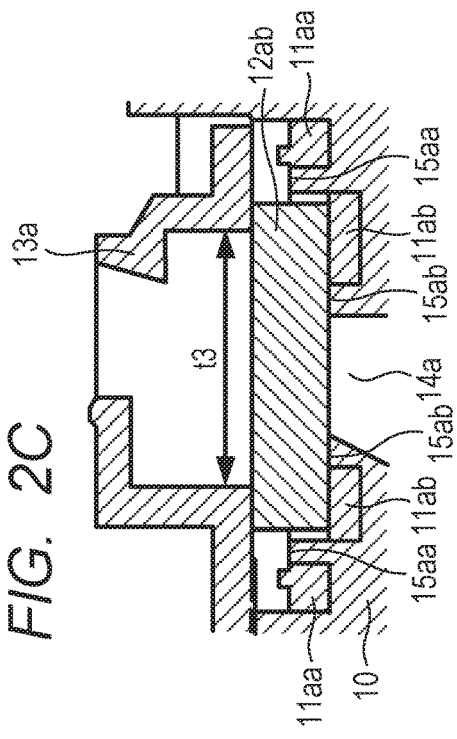
FIG. 2B illustrates a configuration of a dust-proof window according to the embodiment.
Figure 2C:
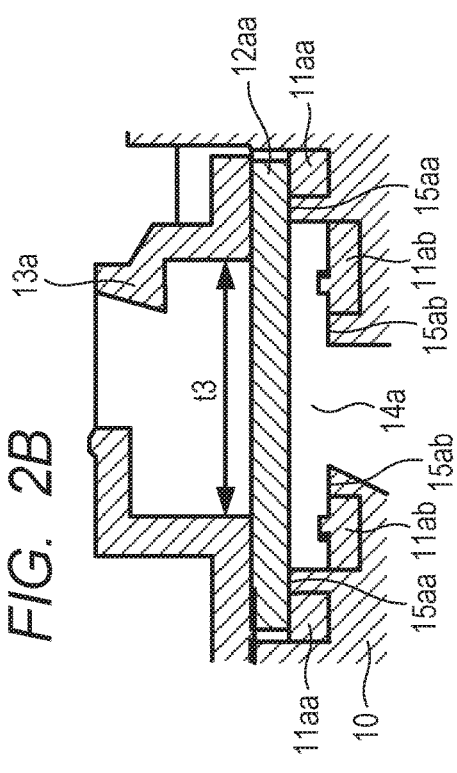
FIG. 2C illustrates a configuration of a dust-proof window according to the embodiment.

FIG. 2A is a perspective view of the optical scanning apparatus 20 with the top cover 10 for covering an opening surface of the casing 35 of the optical scanning apparatus 20 shown in FIG. 1. Openings 14a, 14b, 14c and 14d from which the laser beams LY, LM, LC and LK for exposing the photosensitive drum 21 of each image forming portion are formed on the top cover 10. The cleaning rod guides 13a, 13b, 13c and 13d are placed in the openings 14a, 14b, 14c and 14d. The cleaning rod guides 13a to 13d have the same configuration. Except for the case where a specific cleaning rod guide is referred to, the cleaning rod guides 13a to 13d are described as the cleaning rod guide 13 hereinafter. FIG. 2B and FIG. 2C are schematic views illustrating a cross section of the top cover 10 including the cleaning rod guide 13a when cut by a line C-C shown in the cleaning rod guide 13a in FIG. 2A. The optical scanning apparatus 20 provided below the photosensitive drum 21 as shown in FIG. 9 is provided with a dust-proof window 12 in each opening 14a to 14d of the top cover 10 to prevent a toner from entering into the optical scanning apparatus 20 and causing image defects. The openings 14 refer to the openings of the top cover 10 when the cleaning rod guides 13 and the dust-proof windows 12 are removed from FIGS. 2B and 2C.

FIG. 2B is a cross-sectional view when a dust-proof window 12aa is set up which is a transparent member that allows the laser beam to pass from inside (inside the casing) to outside the casing 35. The dust-proof window 12aa is supported by a bearing surface 15aa which is a bearing surface of the first support portion and abuts a contact portion 11aa which is a first contact portion. FIG. 2C is a cross-sectional view when a dust-proof window 12ab is set up which is a transparent member that allows the laser beam to pass from inside (inside the casing) to outside the casing 35. The dust-proof window 12ab is supported by a bearing surface 15ab which is a bearing surface of the second support portion and abuts a contact portion 11ab which is a second contact portion. The present example cancels defocusing and conjugate point misalignment generated when the sound insulation member 40 covering the periphery of the rotary polygon mirror 31 is assembled. Thus, the dust-proof window 12aa or 12ab of a plurality of thicknesses adaptable is selected to correspond to misalignments so as to provide the selected one on the top cover 10.

Two types of dust-proof windows 12aa and 12ab differing in thickness, width and length can be mounted on the top cover 10 of the present embodiment. For this reason, the bearing surface 15aa corresponding to the dust-proof window 12aa and the bearing surface 15ab corresponding to the dust-proof window 12ab are provided. In the present example, the dust-proof window 12aa has a thickness (in the vertical direction in FIG. 2B (bottom surface direction of the optical box 35)) of 1.8 mm, a width (horizontal direction in FIG. 2B) of 23 mm and a length (back side direction in FIG. 2B) of 273 mm. The dust-proof window 12ab has a thickness of 3.8 mm, a width of 16 mm and a length of 265 mm. Here, it is assumed that the dust-proof window 12aa has the thickness t1, width b1 and length L3, and the dust-proof window 12ab has the thickness t2, width b2 and length L4. A magnitude relationship between the dust-proof window 12aa and the dust-proof window 12ab in each size is thickness t1<thickness t2, width b1>width b2 and length L3>length L4. Materials of the two dust-proof windows 12aa and 12ab are low-cost float glass and their refractive index is on the order of 1.51.

The sizes, materials and refractive indices of the dust-proof windows 12aa and 12ab presented here are examples, and the magnitude relationship between the two dust-proof windows 12aa and 12ab in each size may be satisfied. As shown in FIGS. 2B and 2C, the bearing surfaces 15aa and 15ab are configured as follows to secure cleaning performance of the cleaning rod 100 (see FIG. 7). That is, the bearing surfaces 15aa and 15ab have substantially the same surfaces (the same heights) as top surfaces (cleaning surfaces) which are light beam emission surfaces of the dust-proof windows 12aa and 12ab cleaned with the cleaning rod 100. Therefore, a difference in thickness of 2 mm (=3.8 mm-1.8 mm) between the dust-proof window 12aa and the dust-proof window 12ab in the vertical direction in FIGS. 2B and 2C is provided for the bearing surface 15aa to which the dust-proof window 12aa is supported and for the bearing surface 15ab to which the dust-proof window 12ab is supported.

[Relationship Between Output Speed and Rotation Speed of Rotary Polygon Mirror]

Figure 3:
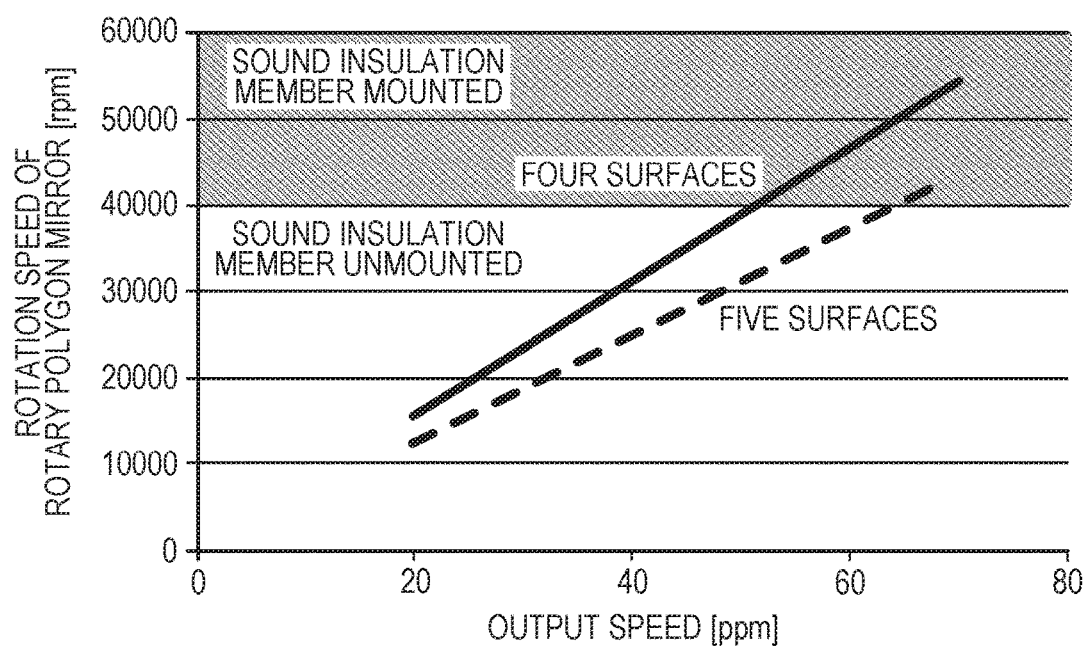
FIG. 3 is a graph illustrating a relationship between an output speed and rotation speed of a rotary polygon mirror according to the embodiment.

Next, a relationship between an output speed which is throughput per unit time of the image forming apparatus and rotation speed (a rotation number) of the rotary polygon mirror 31 of the optical scanning apparatus 20 will be described using FIG. 3. FIG. 3 is a graph illustrating an example of a relationship between the output speed of the image forming apparatus 50 and the rotation speed of the rotary polygon mirror 31 of the optical scanning apparatus 20. In FIG. 3, a horizontal axis represents an output speed (unit: ppm) which is an output sheet count per minute and a vertical axis represents rotation speed (unit: rpm) of the rotary polygon mirror 31. The graph shown by a solid line in FIG. 3 shows a relationship between the output speed and the rotation speed of the rotary polygon mirror 31 when the rotary polygon mirror 31 has a four-surface configuration. The graph shown by a broken line shows a relationship between the output speed and the rotation speed of the rotary polygon mirror 31 when the rotary polygon mirror 31 has a five-surface configuration (see FIG. 11A). As shown in FIG. 3, as the output speed increases, the rotation speed of the rotary polygon mirror 31 also increases. Therefore, in optical scanning apparatus 20 of the present example, when the rotation speed of the rotary polygon mirror 31 exceeds predetermined rotation speed, the periphery of the rotary polygon mirror 31 is covered with the sound insulation member 40 to suppress noise generated from the rotary polygon mirror 31. FIG. 3 illustrates that for a product in which the rotation speed of the rotary polygon mirror 31 exceeds 40000 rpm, the configuration of the optical scanning apparatus 20 is changed so as to mount the sound insulation member 40 (gray-colored area in FIG. 3).

[Selection of Bearing Surface on which Reflection Mirror is Mounted Depending on Presence or Absence of Sound Insulation Member]

Next, a part to be changed depending on the presence or absence of the sound insulation member 40 will be described in detail. Here, description will be given using the optical scanning apparatus 20 when the number of planes of the rotary polygon mirror 31 shown in FIG. 11A is 5 as an example. As shown in FIG. 3, since the rotation speed of the rotary polygon mirror 31 in the image forming apparatus whose output speed is 70 ppm exceeds 40000 rpm which is predetermined rotation speed, the optical scanning apparatus 20 to be mounted requires the sound insulation member 40. In this case, in the present example, the periphery of the rotary polygon mirror 31 is hermetically sealed with the sound insulation member 40 shown in FIG. 11A. Thus, when the laser beams pass through the transparent windows 43a and 43b which are light transmission members provided in the sound insulation member 40, a conjugate point misalignment occurs. As for the scanning optical system of the present example, the light path length of the light-incidence optical system from the light source units 31a and 31b that emit the laser beams to the rotary polygon mirror 31 is approximately 170 mm. The light path length from the deflection surface of the rotary polygon mirror 31 to the image center portion of the photosensitive drum 21 (center part in the main-scanning direction) is approximately 250 mm. The addition of the sound insulation member 40 causes a misalignment of approximately 0.7 mm between the light path length of the incidence optical system up to the rotary polygon mirror 31 and the light path length of the respective scanning optical system. This misalignment occurs in a direction in which the light path length increases (laser beam traveling direction).

For a product having an output speed of 70 ppm, a thin dust-proof window 12aa is set up using the bearing surface 15aa shown in FIG. 2B. In a product without using the sound insulation member 40 and having an output speed of less than 70 ppm, the misalignment of the light path length as in the case using the sound insulation member 40 does not occur. Thus, using the dust-proof window 12ab thicker than the dust-proof window 12aa, the light path length is corrected so as to become the same light path length as that in the case where the sound insulation member 40 is set up. Therefore, the dust-proof window 12ab thicker than the dust-proof window 12aa is set up on the bearing surface 15ab provided at a low position inside the casing 35 (inside the casing) by a difference (2 mm in the vertical direction in FIG. 2B) in thickness compared to the bearing surface 15aa on which the dust-proof window 12aa is set up. Thus, the light path length from the light source to the surface of the photosensitive drum 21 becomes substantially equal irrespective of the presence or absence of the sound insulation member 40. Regarding the combination between the dust-proof windows 12aa and 12ab and the bearing surfaces 15aa and 15ab, only one is used and both are never used for the same product.

The change of the light path length generated in the product provided with the sound insulation member 40 and having an output speed of 70 ppm is attributable to the glass plates used for the transparent windows 42 and 43 of the sound insulation member 40. Therefore, the thickness of the dust-proof window 12b is the sum of the thickness of the dust-proof window 12a and the thickness of two glass plates used for the transparent windows 42 and 43 of the sound insulation member 40. The thickness of the dust-proof window 12b in this case is a thickness when the transparent windows 42 and 43 of the sound insulation member 40 and the dust-proof windows 12a and 12b have the same glass material and the same surface coating. Therefore, when the material of the transparent windows 42 and 43 is different from that of the dust-proof windows 12a and 12b, the thickness relationship of the dust-proof windows 12a and 12b do not always match. In this case, equivalent effects can be obtained by setting the thicknesses of the dust-proof windows 12a and 12b in accordance with the refractive indices of the dust-proof windows 12a and 12b and the transparent windows 42 and 43.

[Setting of Difference in Thickness Between Dust-Proof Windows]

The setting of a difference in thickness between the two dust-proof windows 12a and 12b will be described. As described using FIGS. 12A and 12B, a defocusing amount generated depending on the presence or absence of the sound insulation member 40 that hermetically seals the rotary polygon mirror 31 is different from the amount of conjugate point misalignment with respect to the rotary polygon mirror 31. Therefore, it is not possible to set a difference in thickness between the dust-proof windows 12a and 12b optimum for both the defocusing and the conjugate point misalignment. Therefore, it is necessary to actually select an optimum difference in thickness between the dust-proof windows 12a and 12b at design in accordance with the optical system. The present example will present a plurality of conditions and describe configurations corresponding to the conditions.

Figure 4:
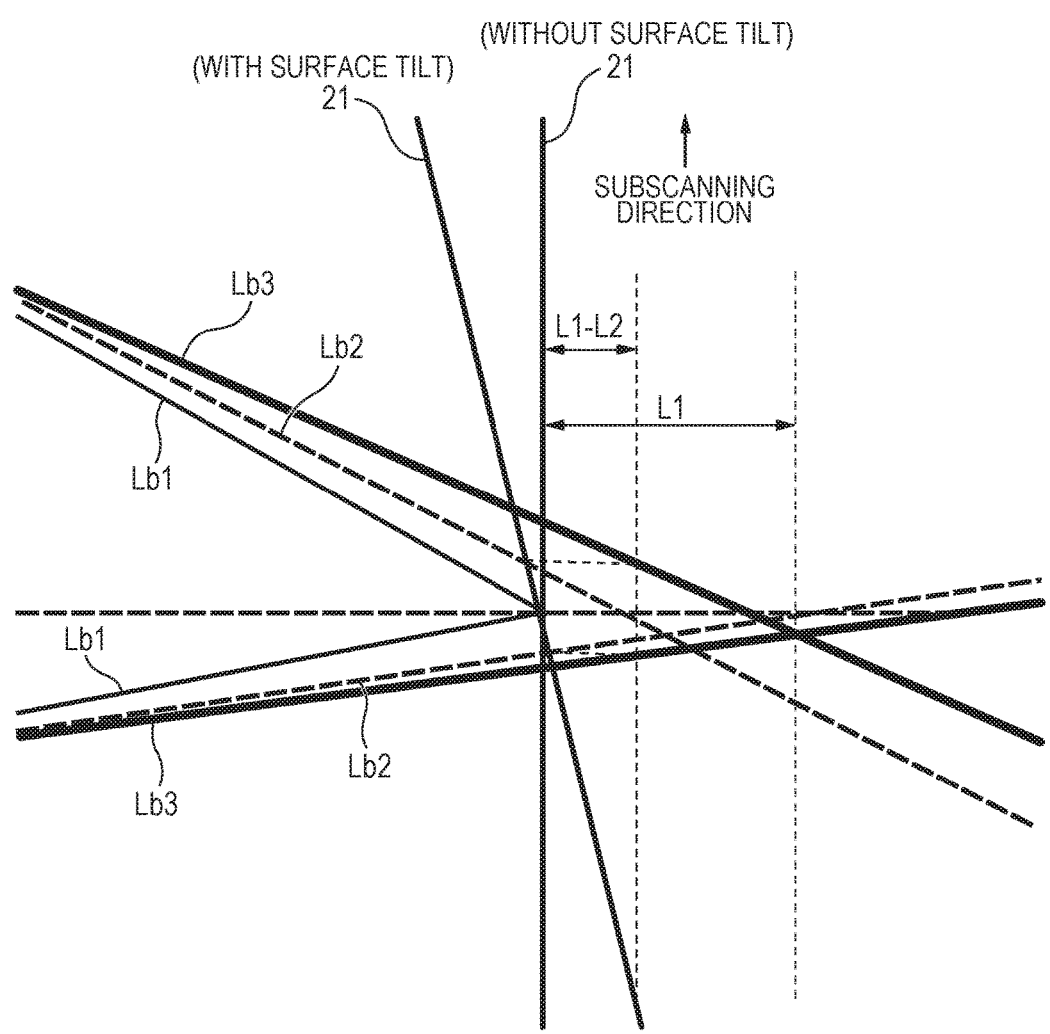
FIG. 4 illustrates a change in focus and conjugate points depending on the presence or absence of a sound insulation member according to the embodiment.

FIG. 4 is a schematic view of optical paths of laser beams extracted from the periphery of the photosensitive drum 21 in FIG. 12B describing the optical paths of the laser beams emitted from the light source units 31a and 31b when there is a surface tilt of the rotary polygon mirror 31. In FIG. 4, an optical path Lb1 represents an optical path when no sound insulation member 40 is provided, an optical path Lb2 represents an optical path after the optical path Lb1 is refracted by the transparent window 42, an optical path Lb3 represents an optical path after the optical path Lb2 is refracted by the transparent window 43. A dotted line at the center in FIG. 4 represents the optical axis of the laser beam.

A misalignment amount L1 shown in FIG. 4 represents a defocusing amount by the transparent windows 42 and 43 of the sound insulation member 40. The position deviated in the laser beam traveling direction by the misalignment amount L1 from the surface of the photosensitive drum 21 represents the position of an optimally focused state when the sound insulation member 40 is set up. Since this position corresponds to an excellently focused state, it is possible to form sharp images. However, since imaging points fluctuate in the subscanning direction due to a surface tilt, banding occurs when the degree of surface tilt is large. A misalignment amount (L1–L2) represents an amount of conjugate point misalignment by the transparent window 43 of the sound insulation member 40, that is, a conjugate point when there is the transparent window 43. The position deviated in the laser beam traveling direction by the distance (L1–L2) from the surface of the photosensitive drum 21 is an end point position of the light path length where an imaging center of gravity in the subscanning direction is placed on the optical axis irrespective of the surface tilt amount of the rotary polygon mirror 31. This position represents a light path length most preventing the occurrence of a coarse/fine distribution of a scan line (occurrence of banding in the image subscanning direction) in the rotation direction (subscanning direction) of the photosensitive drum 21 by a deflection of the optical path by a surface tilt.

A case will be described as a first configuration where a laser beam is shifted in accordance with the amount of conjugate point misalignment. A misalignment of a laser beam generated by the rotary polygon mirror 31 and called a "surface tilt" causes periodic unevenness in an image formed on the photosensitive drum 21. Regarding this surface tilt, the spatial frequency on an image is determined by the number of beams of a light source that emits a laser beam, resolution and the number of planes of the rotary polygon mirror 31, the surface tilt increases according to a pitch thereof and the surface tilt is more likely to be recognized as an image defect. Thus, if the thicknesses or refractive indices of the dust-proof windows 12a and 12b are made to change in the case where the sound insulation member 40 is used so that the light path length is changed by a distance equivalent to the misalignment amount (L1–L2) at the conjugate point shown in FIG. 4, it is possible to keep an optimum state of surface tilt. In this case, a residual by L2 is generated as a defocusing amount on the photosensitive drum 21 as for the optical scanning apparatus 20. However, compared to the defocusing amount L1 generated by the sound insulation member 40, an improvement can be achieved by the difference in thickness of the dust-proof windows 12a and 12b. A system in which a depth of focus can be secured, defocusing with the misalignment amount L2 never causes optical performance to deteriorate. In this way, the light path length difference absorbed by the difference in thickness between the dust-proof windows 12a and 12b is assumed to be substantially equal to (L1–L2). It is thereby possible to absorb the misalignment amount at the conjugate points generated by the light transmission member and satisfactorily keep the surface tilt.

Next, a case will be described as a second configuration where a difference in thickness between the dust-proof windows 12a and 12b is set in accordance with a defocusing amount on the photosensitive drum 21. When the number of beams of the light source used for the optical scanning apparatus 20 or the number of planes of the rotary polygon mirror is small, the cycle of the surface tilt on an image is short, and even when the surface tilt increases to some degree, it is hard to recognize the surface tilt on the image. For an optical system having not much allowance for the depth of focus, the spot diameter changes due to defocusing, the electrostatic latent image thereby becomes shallower, which may constitute a factor causing roughness and density unevenness. In such a case, thicknesses or refractive indices of the dust-proof windows 12a and 12 when the sound insulation member 40 is used are changed so that the light path length may be changed by a distance corresponding to the defocusing amount L1 on the photosensitive drum 21 shown in FIG. 4. This enables the spot diameter to be continuously kept in an optimum state. In this case, only the misalignment amount L2 of conjugate points is generated, but when the pitch on the image is narrow, the image can be sufficiently kept within an allowable range. Thus, the difference in the light path length absorbed by the difference in thickness between the dust-proof windows 12a and 12b is caused to substantially match the L1 which is the defocusing amount generated by the light transmission member. Defocusing on the photosensitive drum 21 can thereby be reduced.

Lastly, a case will be described as a third configuration where a shift is made focusing on both a misalignment amount of conjugate points and a defocusing amount. This is a configuration in which shift amounts are assigned so that the misalignment amount of conjugate points and the defocusing amount due to a surface tilt may be well balanced. In the present configuration, an average shift amount of the defocusing amount L1 and the misalignment amount of conjugate points (L1−L2), that is, (L1+(L1−L2))/2=(L1−(L2/2)) may be set. In this case, although each characteristic value cannot be set to an optimum value, the difference in thickness between the dust-proof windows 12a and 12b can be distributed between both items. Therefore, the pitch of the surface tilt on the image is relatively easy to see and becomes effective in an optical system having not much allowance for the depth of focus. Thus, the difference in the light path length absorbed by the difference in thickness between the dust-proof windows 12a and 12b is assumed to be substantially equal to (L1−(L2/2)). It is thereby possible to set a position with both the defocusing and the conjugate point misalignment caused by the light transmission member taken into consideration and distribute the defocusing and the surface tilt.

[Configuration of Frame Member of Opening]

In recent years, due to atmospheric pollution advancing centered around emerging countries, particles of pollutants may intrude into the optical scanning apparatus 20 and contaminate the mirrors of the rotary polygon mirror 31, consequently causing image defects. In order to prevent such image defects, it is necessary to increase hermeticity of the optical scanning apparatus 20 and improve its dust-proof property. Therefore, irrespective of which of the dust-proof window 12a or 12b is set up, it is necessary to achieve a high dust-proof property of the optical scanning apparatus 20. FIGS. 5A and 5B are perspective views describing a configuration of the frame member 11 of the opening 14a in order to increase hermeticity of the optical scanning apparatus 20. Hereinafter, the frame member 11a provided in the opening 14a of the top cover 10 will be described as a representative, but the frame members 11b to 11d are also applied to the openings 14b to 14d in the same configuration.

FIG. 5A is a perspective view illustrating a shape of the frame member 11a which is a window member having a window-frame shape provided on the opening 14a of the top cover 10, showing a state in which the cleaning rod guide 13 is removed from FIG. 2A. FIG. 5B is a perspective view illustrating the frame member 11a. The frame member 11a is provided with a gate portion 11ac. Through injection molding by a molten elastic member which is a dust-proof member injected from the gate portion 11ac, the elastic member is poured into a groove portion which is a flow pass for the elastic member provided on the perimeter of the bearing surfaces 15aa and 15ab shown in FIGS. 2B and 2C, and the contact portions 11aa and 11ab are formed. The elastic member is, for example, a hot melt material. In the case of the frame member 11a in the present example, two contact portions 11aa and 11ab are formed by one gate portion 11ac and configured integrally with the top cover 10. In the frame member 11a, the contact portion 11ab with which the dust-proof window 12ab is in contact is formed more inside than the contact portion 11aa with which the dust-proof window 12aa is in contact. Therefore, a length L4 in the longitudinal direction of the dust-proof window 12ab is smaller than a length L3 in the longitudinal direction of the dust-proof window 12aa (length L4<length L3).

[Mounting of Cleaning Rod Guide and Dust-Proof Window]

Figure 6:
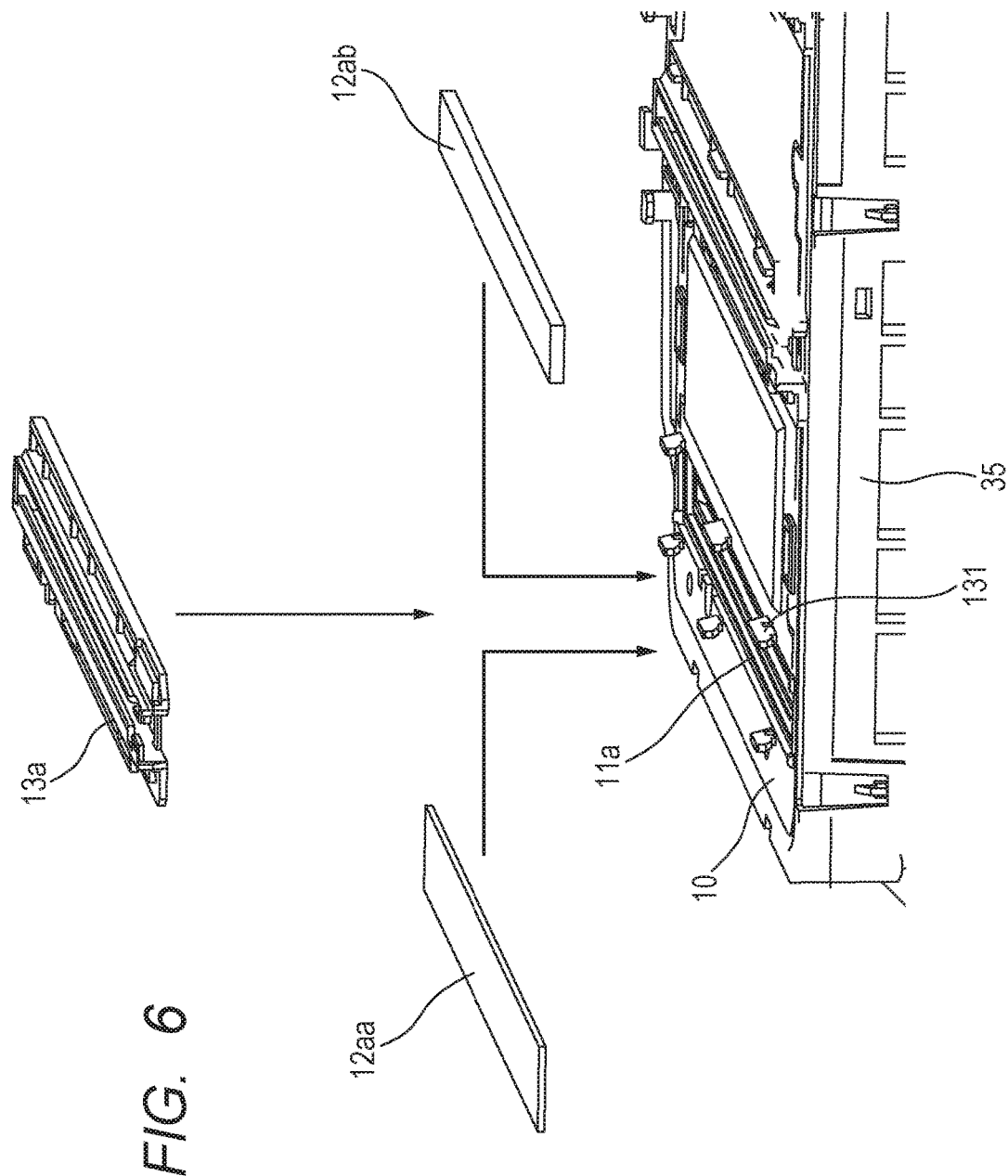
FIG. 6 illustrates mounting of the dust-proof window according to the embodiment.

Next, mounting of the dust-proof window and the cleaning rod guide 13 on the top cover 10 will be described with reference to FIG. 6. FIG. 6 describes mounting of the dust-proof windows 12 (12a and 12b) and the cleaning rod guide 13 which is a fixing member on the top cover 10. In FIG. 6, the dust-proof windows 12a (12aa, 12ab) are placed on the bearing surfaces 15a (15aa, 15ab) of the frame member 11a of the top cover 10 to assemble the cleaning rod guide 13a therein. As for the dust-proof windows 12a, when the sound insulation member 40 is set up, the dust-proof window 12aa is selected and when the sound insulation member 40 is not set up, the dust-proof window 12ab is selected. The dust-proof window 12aa is set up so as to abut the bearing surface 15aa and the dust-proof window 12ab is set up so as to abut the bearing surface 15ab. With the dust-proof window 12a (12aa, 12ab) being pressed, a plurality of projecting portions 131 provided on the top cover 10 engages with holes (not shown) provided in the cleaning rod guide 13a and the position of the cleaning rod guide 13a is thereby determined. When a snap fit (not shown) of the cleaning rod guide 13a engages with the holes provided in the top cover 10, the cleaning rod guide 13a is fixed. The dust-proof windows 12a (12aa, 12ab) are biased by the cleaning rod guide 13 toward the direction of the bearing surfaces 15a (15aa, 15ab).

In FIG. 2B, the dust-proof window 12aa is pressed by the cleaning rod guide 13a against the bearing surface 15aa and fixed to the bearing surface 15aa and is also pressed and fixed against the contact portion 11aa of the frame member 11a which is formed of the elastic member. Similarly, in FIG. 2C, the dust-proof window 12ab is pressed by the cleaning rod guide 13a against the bearing surface 15ab and fixed to the bearing surface 15ab and is also pressed and fixed against the contact portion 11ab of the frame member 11a which is formed of the elastic member. The dust-proof windows 12aa and 12ab are biased by the cleaning rod guide 13a. Therefore, the width in the transverse direction of the dust-proof window 12aa or 12ab is larger than a width t3 (FIGS. 2B and 2C) of the opening between the pressing parts of the cleaning rod guide 13a that press the dust-proof window 12a. Thus, the dust-proof window 12a (12aa or 12ab) is pressed by the cleaning rod guide 13a, remains in contact with the contact portion 11aa or 11ab formed in the frame member 11a which is in contact with the dust-proof window 12a and presses the cleaning rod guide 13a and the contact portion 11aa or 11ab. As a result, the dust-proof window 12a (12aa, 12ab) presses and compresses the contact portion 11a (11aa, 11ab). In this way, the dust-proof window 12a remains in close contact with the contact portion 11aa or 11ab in a state as shown in FIG. 2B or 2C. Hermeticity between the dust-proof window 12a and the top cover 10 is secured and a high dust-proof property can be achieved in this way.

[Cleaning of Dust-Proof Window]

Figure 7:
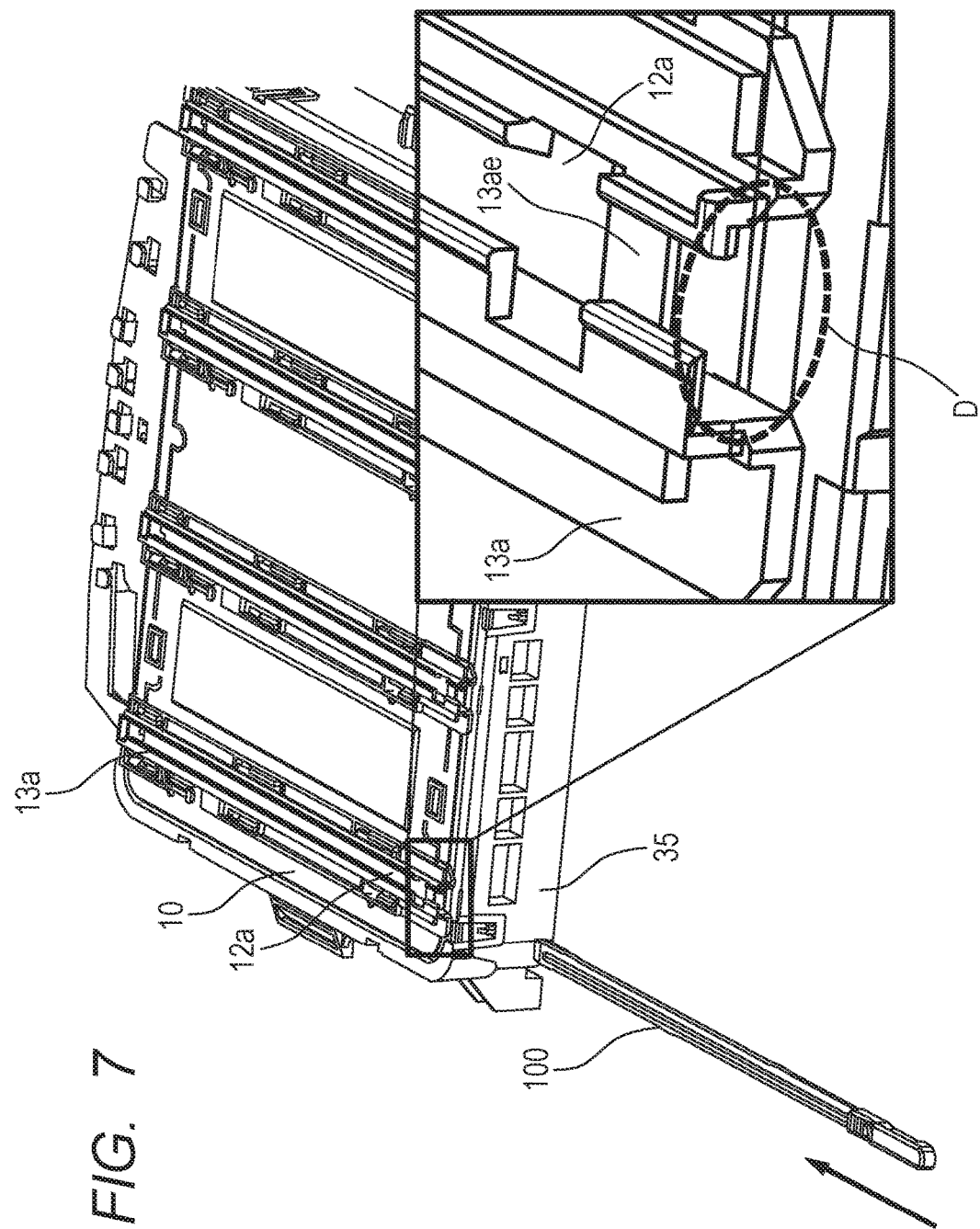
FIG. 7 illustrates a cleaning rod guide according to the embodiment.

In the image forming apparatus 50, a toner dropping from the photosensitive drum 21 located above the optical scanning apparatus 20 or dust or fuzz intruding from outside into the image forming apparatus 50 may adhere to the top surface of the dust-proof window 12. As a result, the laser beam emitted from the optical scanning apparatus 20 is interrupted and the electrostatic latent image is not normally formed on the photosensitive drum 21 to produce image defects. In preparation for such a case, the image forming apparatus 50 is provided with the cleaning rod with which to clean the dust-proof window 12 and the cleaning rod is provided, for example, inside the front door of the image forming apparatus 50. The image forming apparatus 50 is provided, for example, with a guide portion (not shown) having an insertion port of the cleaning rod which is observable when the front door is opened. When the cleaning rod is inserted into the insertion port for the cleaning rod, the guide portion guides the distal end portion in the traveling direction of the cleaning rod to the cleaning rod guide 13. FIG. 7 is a perspective view describing cleaning of the dust-proof window 12a using the cleaning rod 100 which is a cleaning member. FIG. 7 illustrates a situation of cleaning of the dust-proof window 12a of the cleaning rod guide 13a provided in the opening 14a from which the laser beam LY for exposing the photosensitive drum 21a of the image forming portion of yellow (Y). The case with the cleaning rod guide 13a also applies to cleaning of the dust-proof windows 12b to 12d of the cleaning rod guides 13b to 13d provided in the openings 14b to 14d from which the laser beams LM, LC and LK are emitted. Here, cleaning of the dust-proof window 12a of the cleaning rod guide 13a will be described.

In FIG. 7, the cleaning rod 100 is inserted into the insertion port for the cleaning rod 100 provided at the guide portion. The inserted cleaning rod 100 is guided in a direction shown by an arrow and advances toward the insertion port (broken line frame D) upstream in the traveling direction of the cleaning rod 100 of the cleaning rod guide 13a. As shown in an enlarged view of the cleaning rod guide 13a in FIG. 7, a space into which the cleaning rod 100 is inserted to clean the dust-proof window 12a is provided inside the cleaning rod guide 13a. An end portion of the cleaning rod guide 13a from which the cleaning rod 100 is inserted has a shape spread in the horizontal direction in FIG. 7 to facilitate the insertion of the cleaning rod 100. A bridge portion 13ae will be described later.

[Configuration of Cleaning Rod Guide]

FIGS. 8A and 8B are cross-sectional views illustrating a situation in which the cleaning rod 100 advances to the end portion of the cleaning rod guide 13a shown by the broken line frame D in FIG. 7. FIG. 8A illustrates a cross section in the vicinity of the broken line frame D in the longitudinal direction of the cleaning rod guide 13a in which the dust-proof window 12aa is set up. FIG. 8B illustrates a cross section in the vicinity of the broken line frame D in the longitudinal direction of the cleaning rod guide 13a in which the dust-proof window 12ab is set up. In FIG. 8A, the dust-proof window 12aa remains in contact with the contact portion 11aa by being supported by the bearing surface 15aa and pressed by the cleaning rod guide 13a. In FIG. 8B, the dust-proof window 12ab remains in contact with the contact portion 11ab by being pressed by the cleaning rod guide 13a.

The cleaning rod 100 is provided with a cleaning rod frame 101, an elastic member 103 provided at a distal end of the cleaning rod frame 101 and cleaning cloth 102 which is non-woven fabric cloth provided around the elastic member 103. The cleaning rod frame 101 includes a convex portion, a cross section of which has a convex shape. The cross section in the transverse direction of the cleaning rod guide 13a shown in FIG. 7 also has a convex shape. This allows the cleaning rod 100 to be inserted into the cleaning rod guide 13a, to stably move along the groove portion of the cleaning rod guide 13a without shifting in the vertical or horizontal direction and to clean the surface of the dust-proof window 12aa or 12ab.

When the cleaning rod 100 is inserted into the cleaning rod guide 13a, the cleaning rod frame 101 is pressed in the downward direction in FIGS. 8A and 8B (dust-proof window 12a direction) by a top face 13ab of the cleaning rod guide 13a and the elastic member 103 is compressed. This causes the cleaning cloth 102 to be pressed against the surface of the dust-proof window 12a, causes the cleaning rod 100 to move in the horizontal direction in FIGS. 8A and 8B, and can thereby wipe off dirt on the surface of the dust-proof window 12a. Therefore, in the present example, the bearing surface 15aa or 15ab is set so that the surface (cleaning surface) of the dust-proof window 12aa or 12ab is kept to the same height in order to allow the cleaning cloth 102 to perform cleaning by being always pressed against the dust-proof window 12a at a predetermined pressure.

The cleaning rod guide 13a is provided with the bridge portion 13ae integral with the cleaning rod guide 13a so as to prevent the cleaning cloth 102 from hitting corners (edges) of the dust-proof window 12a during cleaning, so that the cleaning cloth 102 does not become fluffy or broken. As shown in FIGS. 8A and 8B, a gap (free space) is produced between the top cover 10 and the end portion on the side in the longitudinal direction on which the cleaning rod 100 of the dust-proof window 12a (12aa or 12ab) is inserted. Therefore, the bridge portion 13ae is provided which connects the top cover 10 and the top surface (cleaning surface) of the dust-proof window 12a which is the surface on the cleaning rod guide 13a side (fixing member side). This provides an effect of avoiding the cleaning cloth 102 from hitting the corners (edges) of the dust-proof window 12a during cleaning with the cleaning rod 100 and preventing the cleaning cloth 102 from becoming fluffy or being broken.

In the present example, a configuration of an optical scanning apparatus under a scheme in which a plurality of image bearing members is exposed using one rotary polygon mirror has been illustrated. However, the configuration need not be the configuration illustrated above, and a configuration using individual optical scanning apparatuses for respective colors can also obtain similar effects.

As has been described so far, according to the present embodiment, it is possible to secure stable optical performance irrespective of the presence or absence of the sound insulation member covering the rotary polygon mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025995, filed Feb. 15, 2017, which is hereby incorporated by reference herein in its entirety.

What is claimed is:

1. A casing of an optical scanning apparatus housing a rotary polygon mirror having a plurality of reflecting surfaces and constructed to deflect a light beam emitted from a light source, the casing further housing an optical member including at least one selected from an imaging lens that causes the light beam deflected by the rotary polygon mirror to be imaged on a photosensitive member and a reflection mirror that guides the light beam deflected by the rotary polygon mirror to the photosensitive member, the casing having an opening that allows passage of the light beam for scanning the photosensitive member, the casing comprising:

a mounting portion on which a sound insulation member is mountable, wherein the sound insulation member separates a first arrangement space of the optical member from a second arrangement space of the rotary polygon mirror, reduces propagation of sound generated by rotation of the rotary polygon mirror from the first arrangement space of the rotary polygon mirror to the second arrangement space of the optical member, and has a transparent window through which the light beam deflected by the rotary polygon mirror is emitted;

a first support portion configured to support a transparent member which covers the opening of the casing in a case where the sound insulation member is mounted to the mounting portion, and which allows the light beam to pass from inside to outside the casing;

a second support portion configured to support a transparent member which covers the opening of the casing in a case where the sound insulation member is not mounted to the mounting portion, which allows the light beam to pass from inside to outside the casing, and which is thicker than the transparent member to be supported by the first support portion for covering the opening of the casing in a case where the sound insulation member is mounted to the mounting portion; and a bearing surface of the second support portion that is to be brought into contact with the transparent member to be supported by the second support portion and that is located on an inner side of the casing, in which the optical member is arranged, is lower than a bearing surface of the first support portion to be brought into contact with the transparent member to be supported by the first support portion, so that a light beam emission surface of the transparent member to be supported by the first support portion and a light beam emission surface of the transparent member to be supported by the second support portion are on a substantially same plane.

2. The casing of an optical scanning apparatus according to claim 1, further comprising a fixing member that comes into contact with the light beam emission surface of the transparent member supported by the first support portion to bias toward the bearing surface of the first support portion, or with the light beam emission surface of the transparent member supported by the second support portion to bias toward the bearing surface of the second support portion.

3. The casing of an optical scanning apparatus according to claim 2, wherein the transparent members to be respectively supported by the first and second support portions satisfy the following magnitude relationship, L3>L4, b1>b2, and t1<t2 when a length in a longitudinal direction of the transparent member to be supported by the first support portion is assumed to be L3, a length in a transverse direction thereof is assumed to be b1, and a thickness thereof is assumed to be t1, and when a length in a longitudinal direction of the transparent member to be supported by the second support portion is assumed to be L4, a length in a transverse direction thereof is assumed to be b2, and a thickness thereof is assumed to be t2.

4. The casing of an optical scanning apparatus according to claim 3, wherein the sound insulation member has a further transparent window to make the light beam emitted from the light source incident from outside the second arrangement space of the rotary polygon mirror thereinto, and a difference in thickness between the transparent member to be supported by the first support portion and the transparent member to be supported by the second support portion is set according to materials and refractive indices of the further transparent window to make the light beam emitted from the light source incident from outside the second arrangement space of the rotary polygon mirror thereinto and the transparent window through which the light beam deflected by the rotary polygon mirror is emitted from the second arrangement space of the rotary polygon mirror into the first arrangement space of the optical member.

5. The casing of an optical scanning apparatus according to claim 4, wherein a difference between a light path length through the transparent member to be supported by the first support portion and a light path length through the transparent member to be supported by the second support portion is substantially equal to L1, when a defocusing amount, that is generated on the photosensitive member by the further transparent window to make the light beam emitted from the light source incident from outside the second arrangement space of the rotary polygon mirror thereinto and the transparent window through which the light beam deflected by the rotary polygon mirror is emitted from the second arrangement space of the rotary polygon mirror into the first arrangement space of the optical member, is assumed to be Ll.

6. The casing of an optical scanning apparatus according to claim 4, wherein a difference between the light path length through the transparent member to be supported by the first support portion and the light path length through the transparent member to be supported by the second support portion is substantially equal to (L1-L2), when a defocusing amount, that is generated on the photosensitive member by the further transparent window to make the light beam emitted from the light source incident from outside the second arrangement space of the rotary polygon mirror thereinto and the transparent window through which the light beam deflected by the rotary polygon mirror is emitted from the second arrangement space of the rotary polygon mirror into the first arrangement space of the optical member, is assumed to be L1, and when a defocusing amount, that is generated by the further transparent window to make the light beam emitted from the light source incident from outside the second arrangement space of the rotary polygon mirror thereinto, is assumed to be L2.

7. The casing of an optical scanning apparatus according to claim 4, wherein a difference between the light path length through the transparent member to be supported by the first support portion and the light path length through the transparent member to be supported by the second support portion is substantially equal to (L1-L2/2), when a defocusing amount, that is generated on the photosensitive member by the further transparent window to make the light beam emitted from the light source incident from outside the second arrangement space of the rotary polygon mirror thereinto and the transparent window through which the light beam deflected by the rotary polygon mirror is emitted from the second arrangement space of the rotary polygon mirror into the first arrangement space of the optical member, is assumed to be Ll, and when a defocusing amount, that is generated by the further transparent window to make the light beam emitted from the light source incident from outside the second arrangement space of the rotary polygon mirror thereinto, is assumed to be L2.

8. The casing of an optical scanning apparatus according to claim 5, wherein the light beam emission surface of the transparent member to be supported by the first support portion and the light beam emission surface of the transparent member to be supported by the second support portion are enabled to be cleaned with a cleaning member.

9. The casing of an optical scanning apparatus according to claim 8, wherein the cleaning member has a frame and non-woven fabric cloth at a distal end of the frame for wiping off dirt on the transparent member supported by the first support portion or the transparent member supported by the second support portion.

10. The casing of an optical scanning apparatus according to claim 9, wherein the fixing member includes a groove portion having a cross section with a convex shape in a transverse direction, and
the frame of the cleaning member has a convex shape that allows the frame to be inserted into the groove portion.

11. The casing of an optical scanning apparatus according to claim 10, wherein the fixing member has a bridge portion that connects the casing and the light beam emission surface of the transparent member supported by the first support portion or the light beam emission surface of the transparent member supported by the second support portion.

12. The casing of an optical scanning apparatus according to claim 11, wherein a width in the transverse direction of the groove portion of the fixing member is smaller than a length in a transverse direction of the transparent member to be supported by the first support portion and a length in a transverse direction of the transparent member to be supported by the second support portion.

13. The casing of an optical scanning apparatus according to claim 12, further comprising a window member arranged in the opening and having the first support portion and the second support portion,
wherein the window member has a first contact portion arranged along a perimeter of the bearing surface of the first support portion and brought into contact with the transparent member to be supported by the first support portion, and a second contact portion arranged along a perimeter of the bearing surface of the second support portion between the bearing surface of the first support portion and the bearing surface of the second support portion and brought into contact with the transparent member to be supported by the second support portion.

14. The casing of an optical scanning apparatus according to claim 13, wherein the window member has a gate portion through which a molten dust-proof member for protecting an interior of the casing from dust is injected, and a flow pass through which the dust-proof member injected from the gate portion flows and in which the first contact portion is formed so as to come into contact with the transparent member supported by the first support portion by being biased with the fixing member or the second contact portion is formed so as to come into contact with the transparent member supported by the second support portion by being pressed with the fixing member.

15. The casing of an optical scanning apparatus according to claim 14, wherein the window member has one gate portion.

16. The casing of an optical scanning apparatus according to claim 1, wherein the casing comprises a plurality of openings including the opening.

* * * * *